US010646045B2

(12) United States Patent
Hill et al.

(10) Patent No.: US 10,646,045 B2
(45) Date of Patent: May 12, 2020

(54) CUSTOMIZABLE AND STOWABLE BODYREST

(71) Applicant: Hypnap LLC, Waltham, MA (US)

(72) Inventors: Chloe Hill, Waltham, MA (US);
HyukJae Henry Yoo, Leonia, NJ (US);
John Lonczak, Newburgh, NY (US)

(73) Assignee: Hypnap LLC, Waltham, MA (US)

( * ) Notice: Subject to any disclaimer, the term of this patent is extended or adjusted under 35 U.S.C. 154(b) by 0 days.

(21) Appl. No.: 16/263,176

(22) Filed: Jan. 31, 2019

(65) Prior Publication Data

US 2019/0159601 A1    May 30, 2019

Related U.S. Application Data

(63) Continuation-in-part of application No. 15/467,130, filed on Mar. 23, 2017, now Pat. No. 10,226,130, (Continued)

(51) Int. Cl.
*A47C 16/00* (2006.01)
*F16M 13/02* (2006.01)
(Continued)

(52) U.S. Cl.
CPC ......... *A47C 16/00* (2013.01); *F16M 11/2021* (2013.01); *F16M 11/38* (2013.01); *F16M 13/022* (2013.01)

(58) Field of Classification Search
CPC ....... B60N 2/4879; A47C 7/383; A47C 20/02; A47C 20/04; A47C 20/046; A47C 20/048; A47C 16/00
See application file for complete search history.

(56) References Cited

U.S. PATENT DOCUMENTS 327,816 A    10/1885    Newbourg
1,855,408 A   4/1932    Montenegro
(Continued)

FOREIGN PATENT DOCUMENTS

CN    202122397       1/2012
EP    2359720 A1      8/2011
(Continued)

OTHER PUBLICATIONS

"4 Secrets to Easier Breathing", Bottom Line Health, Feb. 1, 2014, bottomlinehealth.com/4-secrets-to-easier-breathing.
(Continued)

*Primary Examiner* — Timothy J Brindley
(74) *Attorney, Agent, or Firm* — Intrinsic Law Corp.

(57) ABSTRACT

A personal support apparatus includes a frame having an inner surface for supporting a forehead of a user while seated in a forward-leaning position. The frame has a hollow central region to receive the user's face when the user is seated in the forward-leaning position. The apparatus also includes a stand that includes a chest support arm and a pivot angle adjustment arm. The pivot angle adjustment arm is pivotably attached to a base, and a first end of the base is adjustably attached along at least a portion of the length of the chest support arm. The frame is pivotably attached to an end of the chest support arm. The height and angle of the frame are customizable by adjusting the length of the chest support arm and the length of the pivot angle adjustment arm. The apparatus can be configured in a stowed configuration for compact storage.

24 Claims, 25 Drawing Sheets

Related U.S. Application Data which is a continuation-in-part of application No. 14/680,864, filed on Apr. 7, 2015, now Pat. No. 9,637,031.

(60) Provisional application No. 62/398,660, filed on Sep. 23, 2016, provisional application No. 62/127,612, filed on Mar. 3, 2015, provisional application No. 61/976,563, filed on Apr. 8, 2014.

(51) Int. Cl.
    *F16M 11/20* (2006.01)
    *F16M 11/38* (2006.01)

(56) References Cited

U.S. PATENT DOCUMENTS

| | | | |
|---|---|---|---|
| 2,693,400 | A | 11/1954 | Erickson |
| 3,386,392 | A | 6/1968 | Gramm |
| 3,625,161 | A | 12/1971 | Rosner |
| 3,828,377 | A | 8/1974 | Fary |
| 5,044,026 | A | 9/1991 | Matthews |
| 5,046,433 | A | 9/1991 | Kramer et al. |
| 5,269,229 | A | 12/1993 | Akapantangkul |
| 5,370,060 | A | 12/1994 | Wang |
| 6,581,226 | B1 | 6/2003 | Brustein |
| 6,647,573 | B2 | 11/2003 | Corbin |
| 6,684,431 | B2 | 2/2004 | Splane, Jr. |
| 6,857,149 | B2 | 2/2005 | Hoggatt et al. |
| 7,036,168 | B1 | 5/2006 | Knickerbocker |
| 7,364,129 | B1 | 4/2008 | Levari, Jr. |
| 8,011,731 | B2 | 9/2011 | Goddu |
| 8,176,587 | B2* | 5/2012 | Matt ............... A61G 13/121 5/638 |
| 8,205,283 | B1 | 6/2012 | Russell |
| D683,463 | S | 5/2013 | Huggins |
| 8,468,628 | B1 | 6/2013 | Cheng |
| 8,528,978 | B2 | 9/2013 | Purpura et al. |
| 8,985,693 | B2 | 3/2015 | Purpura et al. |
| 9,226,587 | B2* | 1/2016 | Halimi ............. A47C 16/00 |
| 9,877,588 | B2* | 1/2018 | Belleh ............. A47C 16/00 |
| 2002/0050009 | A1 | 5/2002 | Ley |
| 2002/0100846 | A1* | 8/2002 | Tinsley ............. A61G 13/12 248/118 |
| 2003/0172462 | A1 | 9/2003 | Hoggatt et al. |
| 2008/0269544 | A1 | 10/2008 | Atkin et al. |
| 2008/0303318 | A1* | 12/2008 | Hamilton ............. A47C 16/00 297/129 |
| 2009/0236893 | A1 | 9/2009 | Ehlers et al. |
| 2010/0117435 | A1 | 5/2010 | Samuelsen |
| 2011/0277238 | A1* | 11/2011 | Mabry ............. A47C 16/00 5/112 |
| 2012/0181821 | A1 | 7/2012 | Edalati et al. |
| 2013/0007961 | A1 | 1/2013 | Noh |
| 2013/0232696 | A1 | 9/2013 | Halimi et al. |
| 2014/0033439 | A1* | 2/2014 | Berhanu ............. A47C 16/00 5/640 |
| 2015/0001905 | A1* | 1/2015 | Jackow ............. A47C 7/383 297/397 |
| 2015/0123450 | A1* | 5/2015 | Miller ............. A47C 9/005 297/488 |
| 2016/0120326 | A1* | 5/2016 | Belleh ............. A47C 16/00 297/392 |
| 2016/0151221 | A1* | 6/2016 | Mount ............. A47C 7/38 5/638 |

FOREIGN PATENT DOCUMENTS

| | | |
|---|---|---|
| EP | 2589535 A1 | 5/2013 |
| WO | WO2009108823 A1 | 9/2009 |
| WO | WO2010129652 A1 | 11/2010 |
| WO | WO2010138216 A1 | 12/2010 |
| WO | WO2011066994 A2 | 6/2011 |

OTHER PUBLICATIONS

E. Dean, "Effect of Body Position on Pulmonary Function", Physical Therapy, May 1985, p. 613-618, vol. 65, No. 5.

"Labor and birth: 1st Stage of Labor (part 5)—Positions for First Stage of Labor", women.programming4.us/health/labor-and-birth-1st-stage-of-labor-(part5)-positions-for-first-stage-of-labor.aspx#3VQLHcqRwptV32B0.99.

"Getting the air you need: A practical guide to coping with and managing shortness of breath", Juravinski Cancer Centre Information for patients and families, Hamilton Health Sciences, Ontario, Canada.

"Why is exercise important", British Lung Foundation, www.bif.org.uk/Page/Why-is-exercise-important.

"Mind-Body skills for Regulating the Autonomic Nervous System", Jun. 2011, Version 2, Defense Centers of Excellence for Psychological Health & Traumatic Brain Injury, Virginia.

Skyrest, "Skyrest Travel Pillow", sold by Planet Stuff, www.amazon.com/Skyrest-Travel-Pillow/dp/B00GMQU948 .

EZsnooZ, "eZsnooZ All Purpose Travel Cushion", via YouTube, uploaded Jul. 21, 2008, www.youtube.com/watch?v=IEaenYh-jFg.

Eugene, OR Website, "Diaphragm Deep Breathing", www.eugene-or.gov/DocumentCenter/View/14142.

Wikipedia, "Tripod position", Wikipedia, the free encyclopedia.

U.S. International Searching Authority, "International Search Report and Written Opinion of the International Searching Authority, App. No. PCT/US15/24817", dated Jul. 13, 2015, WIPO.

\* cited by examiner

CUSTOMIZABLE AND STOWABLE BODYREST

RELATED APPLICATIONS

This application is a continuation-in-part of U.S. patent application Ser. No. 15/467,130, titled "Bodyrest," filed on Mar. 23, 2017, which is a continuation-in-part of U.S. patent application Ser. No. 14/680,864, titled "Bodyrest," filed on Apr. 7, 2015, now U.S. Pat. No. 9,637,031, which claims priority to U.S. Provisional Application No. 61/976,563, titled "Headrest," filed on Apr. 8, 2014, and to U.S. Provisional Application No. 62/127,612, titled "Bodyrest," filed on Mar. 3, 2015. U.S. patent application Ser. No. 15/467,130 also claims priority to U.S. Provisional Application No. 62/398,660, titled "Mobile Device Stand," filed on Sep. 23, 2016. Each of the foregoing applications is hereby incorporated by reference.

TECHNICAL FIELD

The present application generally relates to devices for supporting the body and more particularly to devices for supporting the head and upper body in a forward-leaning position.

BACKGROUND

Sleeping in the seated position is difficult for most people. There are occasions where and reasons why people desire rest and sleep but are unable to avoid the seated position, for example when the person is on an airplane, in a wheelchair, or at an office desk. Also, some people cannot sleep in bed due to back pain or other physical issues. The airline industry has attempted to address this issue by allowing passengers to recline in their seats. However, most economy and business class seats do not recline more than 35 degrees, which most people still find uncomfortable.

Many devices have been conceived and created to address this problem. However, none have solved this problem to a satisfying degree. Existing headrests, backrests, and bodyrest devices designed to be used while seated in the upright position (e.g., neck pillows, sleep aids and the like) can support, decrease pressure, and reduce strain on the neck or back, but not both the neck and back simultaneously. Thus comfort for the user is never fully realized. For example, neck pillows and neck supports are placed behind or next to the user. While such devices take the pressure off the neck, there is still considerable discomfort and strain on the back because the user is forced to hold herself upright by using other muscles. Backrests can reduce pressure from certain muscle groups in the back. However, the user is still required to hold himself upright using other muscle groups. Also, pressure and strain remain on the neck because the neck is not supported. Moreover, if the user does manage to fall asleep using a backrest, the user's head often tilts forward causing the person to wake up.

Some headrests can be used while the user leans forward (e.g., on an airplane tray table). However, such headrests are deficient in several aspects. For example, some of these headrests lack an opening for breathing so the user must turn her head to the side. This causes strain on and discomfort of the neck because the neck bears most of the pressure and weight. Also, the headrests do not support the user's upper body so must use certain back muscles to partially support the torso so that the neck does not bear all of the weight and pressure. Furthermore they are not adjustable in height or angle so users of different heights are not accommodated and proper alignment of the back and neck is not achieved. Also, there is no existing sleep or rest aid that allows the user to lean in a face-down, forward leaning position that is not only adjustable in height and in angle but is also collapsible and portable so that the user can easily transport and carry the device while traveling.

An example of an existing headrest that includes some or all of these deficiencies is disclosed in U.S. Pat. No. 6,684,431 ("the '431 patent"), titled "Angle-Adjustable Tabletop Personal Support Apparatus." This headrest is designed to support a user's head and upper body while the user is having an upper-body massage. One deficiency in this headrest is that its bulky cushions (e.g., formed of stuffed foam) increase the form factor of the headrest and make its portability difficult or impossible. However, the bulky cushions are an important component of the headrest because they provide comfort to the user even though the adjustability of the headrest is limited.

In addition, people with respiratory illnesses such as chronic obstructive pulmonary disease (there are approximately 3 million cases in the U.S. per year) are frequently prescribed by doctors and physical therapists to rest in the supported forward-leaning position as an adjunct to medical treatment when breathing becomes difficult. Resting in such a lean forward position optimizes the mechanics of respiration by easing the work of the chest muscles and engaging the diaphragm allowing people to breathe easier and deeper. People with certain back problems and pain such as those with herniated discs and pregnant women are also frequently prescribed by doctors to rest in the supported forward-leaning position to ease back pain. People who have herniated discs find both lying down and sitting up to be painful. The only way for people with herniated discs to get comfortable is to rest in the supported forward-leaning position because this position expands the spine, easing pressure of the discs of the spine against the nerves and cartilage that are between and close to the discs. In addition, it is difficult for some people with muscular dystrophy to sit upright for long periods of time due to weakened back and neck muscles. Lying down or resting in the supported lean forward position is the only way to ease the pressure on the back and neck muscles. Some people with the conditions mentioned above are in so much pain that they must have access to places that they can rest in the forward-leaning position often and for long periods of time making it difficult for them to leave their home and for them to work and be productive.

Currently, there is no device that is lightweight, portable, and collapsible that allows people to rest in the supported lean-forward position to relieve their pain symptoms when they are out of the home, and when they are in the home, they must resort to rest leaning forward against a pillow placed on a table or desk or sit backwards in a chair and lean against the back of the chair which is not ideal or comfortable. Others must purchase a costly and cumbersome forward leaning massage chair.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a personal support apparatus comprising: a frame having an inner surface for supporting a forehead of a user while seated in a forward-leaning position, the frame having a hollow central region to receive the user's face when the user is seated in the forward-leaning position; a stand comprising a chest support arm and a pivot angle adjustment arm; and a base, wherein: a length of the chest support arm is adjustable, the length of the chest support arm extending from a first end to a second end of the chest support arm, the first end of the chest support arm is pivotably attached to the frame, a length of the pivot angle adjustment arm is adjustable, the length of the pivot angle adjustment arm extending from a first end to a second end of the pivot angle adjustment arm, the first end of the pivot angle adjustment arm is releasably attached to the chest support arm, the second end of the pivot angle adjustment arm is pivotably attached to the base, and the chest support arm is adjustably attached to the base.

In one or more embodiments, the base includes a clamp that receives an edge of a working surface. In one or more embodiments, the base includes a base plate that is adjustable relative to the clamp along an axis of the base such that the base plate can adjustably move towards or away from the user while the clamp is disposed on the edge of the working surface.

In one or more embodiments, a first end of the base is releasably attached to the chest support arm at an attachment point, the attachment point being adjustable along at least a portion of the length of the chest support arm. In one or more embodiments, the attachment point corresponds to a height of the frame with respect to the base. In one or more embodiments, the height of the frame is further adjustable by adjusting the length of the chest support arm.

In one or more embodiments, the length of the pivot angle adjustment arm corresponds to a pivot angle of the chest support arm. In one or more embodiments, the pivot angle corresponds to an angular orientation of the frame. In one or more embodiments, the pivot angle is further adjustable by adjusting the length of the chest support arm.

In one or more embodiments, the chest support arm includes first and second plates that slideably engage each other to adjust the length of the chest support arm. In one or more embodiments, the apparatus has a stowed configuration where the pivot angle adjustment arm is detached from the chest support arm, the pivot angle adjustment arm is pivoted against the base, the chest support arm is pivoted against the pivot angle adjustment arm, and the frame is pivoted inwardly against the chest support arm. In one or more embodiments, in the stowed configuration: the frame, the chest support arm, the pivot angle adjustment arm, and the base are disposed substantially parallel to one another, and a height of the apparatus in the stowed configuration is smaller than the height of the apparatus in a deployed configuration. In one or more embodiments, the apparatus further comprises a chest support cushion releasably attached to the chest support arm.

Another aspect of the invention is directed to a personal support apparatus having stowed and deployed configurations, the apparatus comprising: a frame having an inner surface for supporting a forehead of a user while seated in a forward-leaning position, the frame having a hollow central region to receive the user's face when the user is seated in the forward-leaning position; a base; a chest support arm having first and second ends, the first end of the chest support arm pivotably attached to the frame; and a pivot angle adjustment arm having first and second ends, the second end of the pivot angle adjustment arm pivotably attached to the base, wherein: in the deployed configuration: the first end of the pivot angle adjustment arm is releasably attached to the chest support arm, and the chest support arm is adjustably attached to the base, and in the stowed configuration: the first end of the pivot angle adjustment arm is detached from the chest support arm, the pivot angle adjustment arm is pivoted against the base, the chest support arm is pivoted against the pivot angle adjustment arm, and the frame is pivoted inwardly against the chest support arm.

In one or more embodiments, in the stowed configuration: the frame, the chest support arm, the pivot angle adjustment arm, and the base are disposed substantially parallel to one another, and a height of the apparatus in the stowed configuration is smaller than the height of the apparatus in a deployed configuration. In one or more embodiments, a length of the chest support arm is adjustable, the length of the chest support arm extending from the first end to the second end of the chest support arm, and in the deployed configuration, a height of the frame with respect to the base is adjustable by adjusting the length of the chest support arm. In one or more embodiments, in the deployed configuration, a first end of the base is releasably attached to the chest support arm at an attachment point, the attachment point being adjustable along at least a portion of the length of the chest support arm. In one or more embodiments, the height of the frame is further adjustable by adjusting the attachment point along at least a portion of the length of the chest support arm.

In one or more embodiments, in the deployed configuration, the length of the pivot angle adjustment arm corresponds to a pivot angle of the chest support arm. In one or more embodiments, the pivot angle corresponds to an angular orientation of the frame. In one or more embodiments, the pivot angle is further adjustable by adjusting the length of the chest support arm. In one or more embodiments, the apparatus further comprises a chest support cushion adjustably attached to the chest support arm.

In one or more embodiments, the base includes a base plate that slidingly engages a clamp plate along an axis, the clamp plate including a clamp that receives an edge of a working surface, such that in the deployed configuration the base plate can adjustably move towards or away from the user while the clamp is disposed on the edge of the table. In one or more embodiments, in the deployed configuration: a first end of the base is releasably attached to the chest support arm at an attachment point, the attachment point being adjustable along at least a portion of the length of the chest support arm, and the chest support arm can extend below a plane of the working surface when the base plate is moved towards the user to extend a height range of the frame with respect to the base.

IN THE DRAWINGS

For a fuller understanding of the nature and advantages of the present invention, reference is made to the following detailed description of preferred embodiments and in connection with the accompanying drawings.

DETAILED DESCRIPTION

Figure 1:
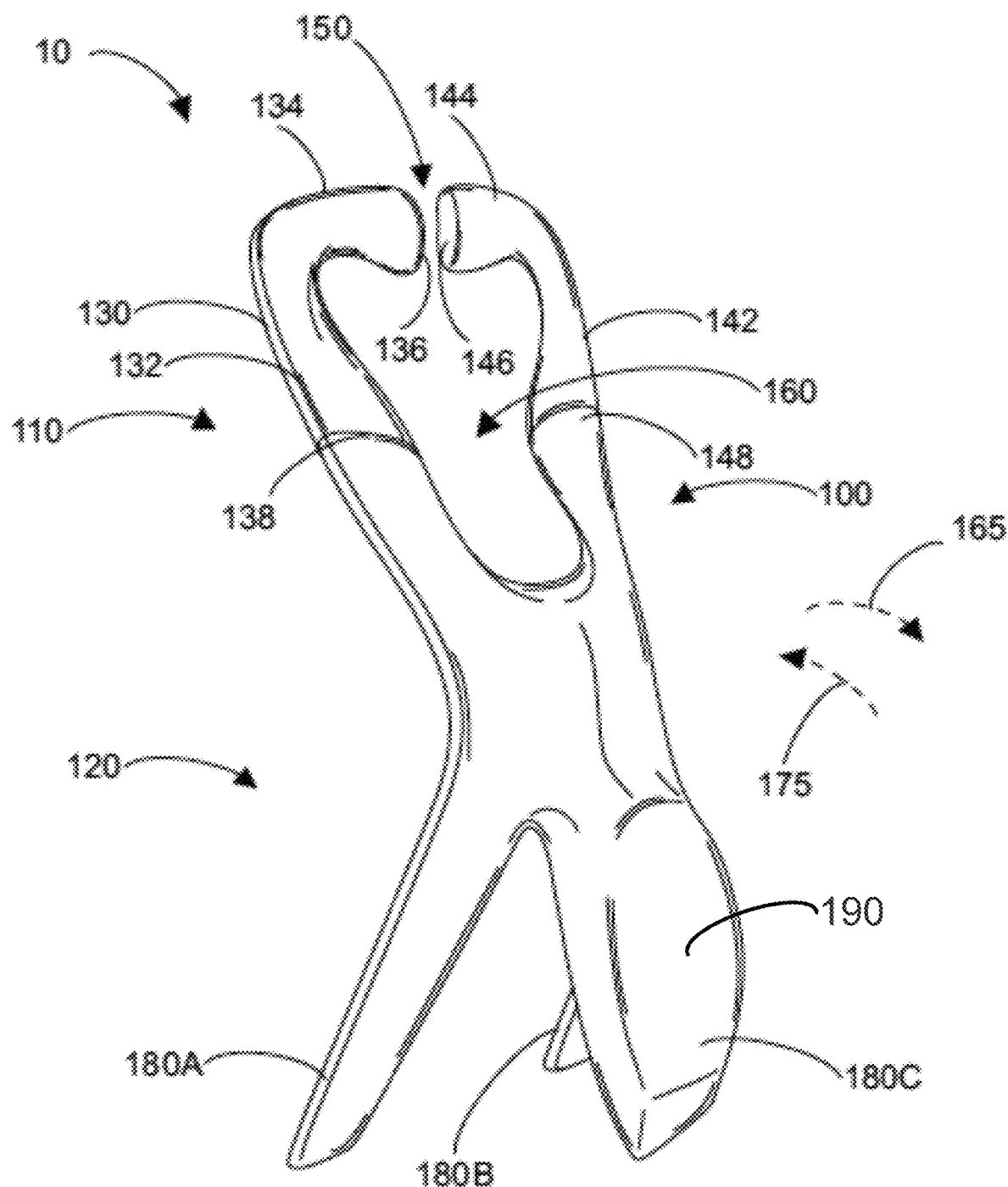
FIG. 1 illustrates a perspective view of a bodyrest according to an embodiment.

This disclosure describes bodyrests and body supports configured for users seated in a forward-leaning position. The bodyrest includes a head support mechanically connected to a body. The head support includes one or more support members that are configured to support one or more portions of a user's face, such as the user's forehead and/or the sides of the user's face (e.g., cheeks or jawline). The support members define an aperture or gap that is aligned with one or more sensory organs on the user's face. For example, the aperture or gap can be aligned with the user's mouth, nose, and/or eyes.

A chest support can be mechanically coupled and/or integrated with the elongated body. The chest support can include a pad or pillow to mechanically support the user's chest and upper body while a user's head is disposed in the bodyrest.

The base can have a generally planar surface to conform to a tabletop or airline tray table. In addition or in the alternative, the base can include a support member that defines an open channel that can grip an edge of a table or airline tray table.

The bodyrest can be adjusted along multiple degrees of freedom. For example, the height of the head support can be adjusted with respect to the base. In addition or in the alternative, the head support can pivot towards or away from the user to support the user's head at different positions and angles. In addition or in the alternative, the support members can be adjusted laterally to fit different size heads. In addition or in the alternative, a position of the chest support pillow can be adjusted with respect to the base so the chest support pillow can have an adjustable height to accommodate different users. In addition or in the alternative, the body and/or the base can move towards or away from the user to adjust a distance between the user and the bodyrest.

In some embodiments, the bodyrest can be folded and/or broken down into various components for portability and storage.

The bodyrests disclosed herein can provide improved comfort for the user. The bodyrests can reduce pain and/or strain on the torso including the back, shoulders, and neck. In addition, the bodyrests can facilitate deeper, easier and/or more efficient breathing by allowing the user to rest in a supported forward-leaning position. For example, the bodyrests can reduce the workload of the chest muscles and prevent engaging the diaphragm.

Such bodyrests can be beneficial (e.g., as an adjunct to medical treatment) for users with respiratory diseases including chronic lung disease and/or for users with certain back problems, such as back problems that occur while traveling in an airplane seat.

It is understood that the present disclosure is often drafted in the context of a user sitting on a seat such as an airplane seat, but the present disclosure is not so limited, and can be applied to various types of users as would be appreciated by those skilled in the art with suitable modifications to the size and/or form factor of the device, without departing from the spirit of the disclosure. For example, the disclosure can be applied to users in a wheelchair, in a hospital setting, or at a desk.

FIG. 1 illustrates an embodiment of a foldable bodyrest 10 for a user in a forward-leaning position. The bodyrest 10 includes a body 100 having an upper portion 110 and a lower portion 120. The upper portion 110 includes a first support arm 130 and a second support arm 140. As illustrated, the first support arm 130 includes a first generally vertical section 132 and a first generally horizontal section 134. Likewise, the second support arm 140 includes a second generally vertical section 142 and a second generally horizontal section 144. The first and second horizontal sections 134, 144 extend inwardly towards each other. The first and second support arms 130, 140 can be generally symmetrical. The bodyrest 10 can be a personal support apparatus and/or a personal rest system.

When the user leans forward, the first and second support arms 130, 140 are disposed against the user's face to provide support thereto. For example, the first vertical section 132 of the first support arm 130 can be disposed against a first side of a user's face, such as the user's first cheek. The first horizontal section 134 of the first support arm 130 can be disposed against a top of the user's face, such as a first portion of the user's forehead. Likewise, the second vertical section 142 of the second support arm 140 can be disposed against a second side of a user's face, such as the user's second cheek. The second horizontal section 134 of the second support arm 140 can be disposed against a top of the user's face, such as a second portion the user's forehead.

A gap 150 is disposed between a first end 136 of the first horizontal section 134 and a second end 146 of the second horizontal section 144. The gap 150 allows the first and second support arms 130, 140 to flexibly adjust to the size of the user's face (e.g., the size of the user's forehead).

The first and second support arms 130, 140 define an aperture 160 therebetween. The aperture 160 is generally aligned to a user's face when the user is in a forward-leaning position. For example, the user's mouth, nose, and/or eyes can be aligned with the aperture 160. The aperture 160 allows the user to breathe easily while using the bodyrest 10 and to do various activities such as speak, sleep, read, look at a computer or tablet, etc.

The first and second vertical sections 132, 142 of the first and second support arms 130, 140 include first and second creases 138, 148, respectively. The creases 138, 148 allow the support arms 130, 140 to fold approximately in half for storage and/or portability. The support arms 130, 140 can fold towards the user in a first direction 165 while the support arms 130, 140 support the user in a second direction 175 away from the user. It is noted that the first and second arms 130, 140 can include additional creases and/or folds as would be recognized by those skilled in the art.

The lower portion 120 of the body 100 includes three legs 180A, 180B, and 180C. Legs 180A and 180B are disposed away from the user while leg 180C is disposed towards the user to form a tripod-like stand. The legs 180A-C can pivot with respect to the body 100 to a partially portable or stowed position. In the partially-stowed position, the legs 180A-C are aligned with respect to the upper portion 120 of the body 100 to form a generally planar surface, thus reducing the size of the body 100 along an axis orthogonal to the planar surface. As recognized by those skilled in the art, the bodyrest 10 can include additional or fewer legs 180A-C. Likewise, the legs 180A-C can be in different configurations, such as two legs disposed towards the user and one leg disposed away from the user.

At least one leg 180C includes a chest support 190. The chest support 190 includes a cushion and/or a rubber-like material for supporting the user's chest when the user is seated in a forward-leaning position. The chest support 190 can provide additional comfort to the user by supporting a portion of the user's weight. In some embodiments, a height and/or position of the chest support 190 is adjustable to provide a degree of freedom. For example, the chest support 190 can be removably attached to the leg 180C (e.g., with a hook and loop fastener).

Figure 2:
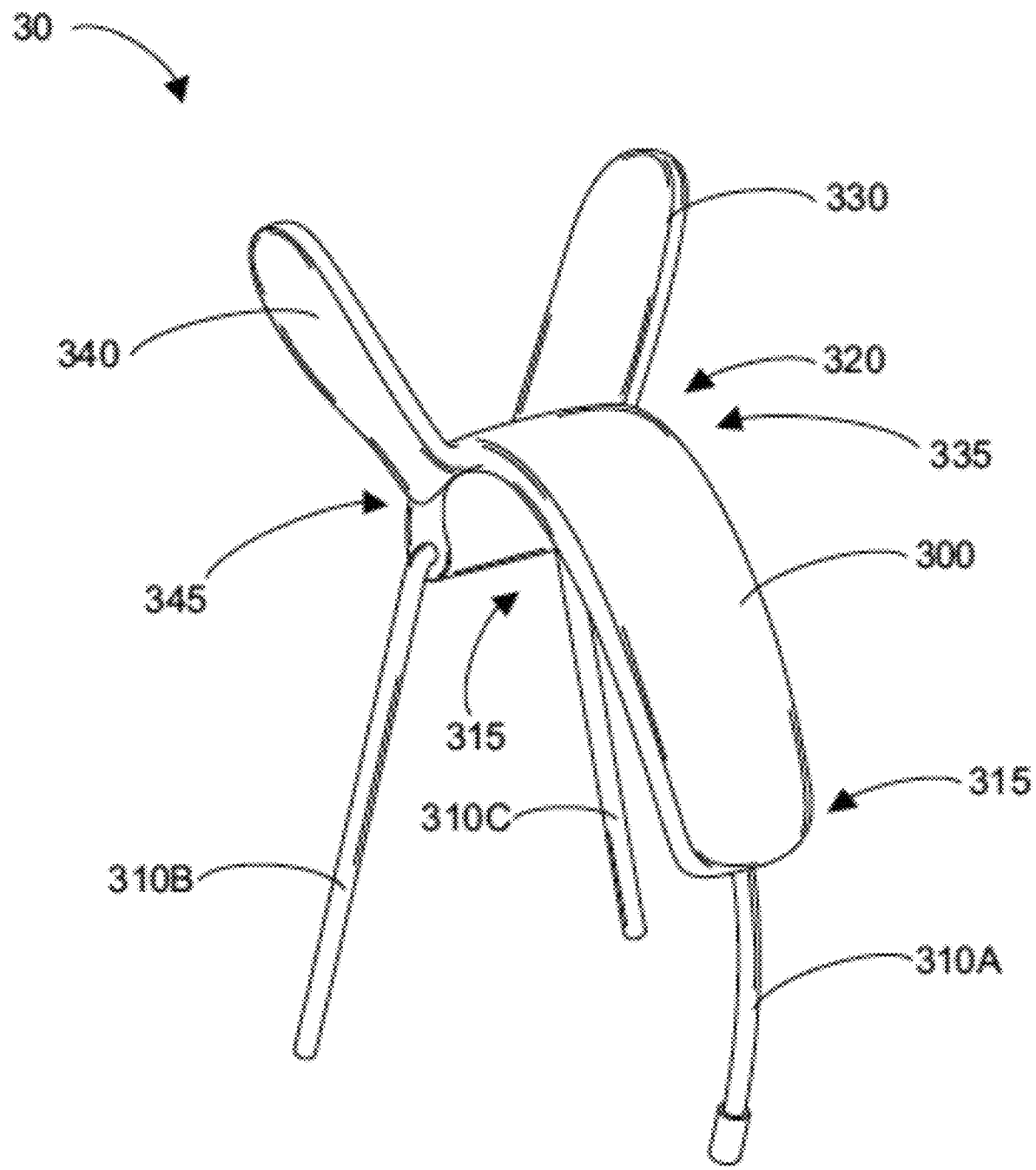
FIG. 2 illustrates a perspective view of a bodyrest according to an embodiment.

FIG. 2 illustrates an embodiment of a bodyrest 30 or personal support system for a user seated in a forward-leaning position. The bodyrest 30 includes a central body 300 coupled to legs 310A, 310B, 310C. The body 300 is generally elongated from a first end 315 to a second end 320. In addition, the body 300 is arched 315 away from the legs 310A-C from the first end 315 to the second end 320. The first end 315 is disposed proximally a user. The second end 320 is disposed distally to the user. Lateral supports 330, 340 are coupled to opposing sides 335, 345, respectively, of the second end 320 of the body. The bodyrest 30 can be a personal support apparatus and/or a personal rest system.

The legs 310A-C mechanically mount to and/or support the body 300 on a surface 350. In some embodiments, a height of the legs 310A-C is mechanically adjustable (e.g., telescoping) to accommodate users of various heights to provide a degree of freedom. In addition or in the alternative, the legs 310A-C are removable and/or pivotable for enhanced storage and portability.

In use, the arch 315 in the body 300 conforms and provides support to the user's torso/chest while the second end 320 of the body 300 supports the bottom of the user's head (e.g., the user's chin). The lateral supports 330, 340 can be configured to rest against opposing sides of the user's face (e.g., along the temples and/or cheeks) while using the bodyrest 30.

Figure 3:
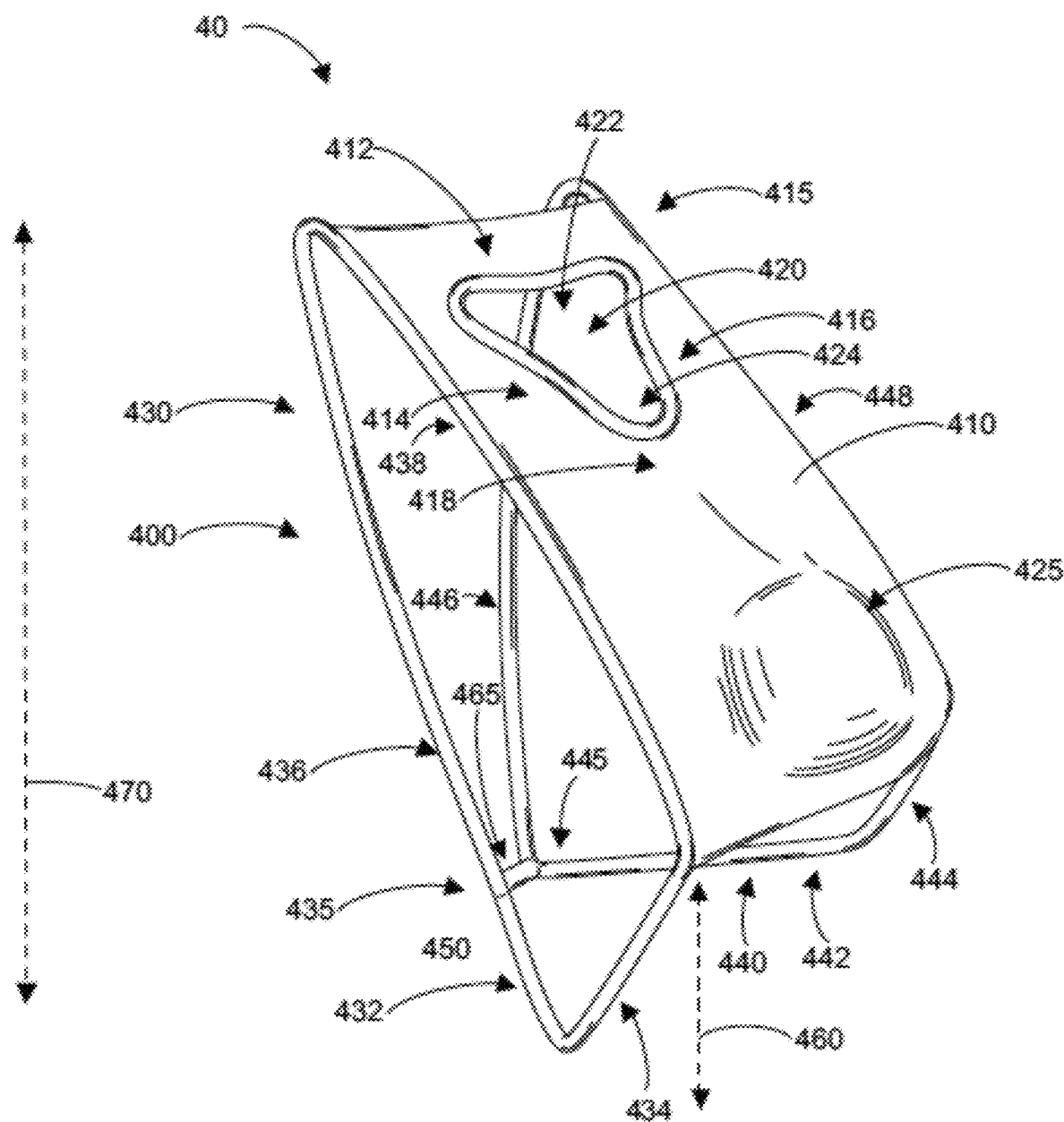
FIG. 3 illustrates a perspective view of a bodyrest according to an embodiment.

FIG. 3 illustrates a perspective view of an embodiment of a bodyrest 40 for a user seated in a forward-leaning position. The bodyrest 40 can be a personal support apparatus and/or a personal rest system.

The bodyrest 40 includes a stretchable support 410 mounted on a frame 400. The support 410 defines an aperture 420 at a first end 415 thereof for receiving a portion of the user's face. The aperture 420 includes a first part 422 that generally aligns with the user's eyes and a second part 424 that generally aligns with the user's nose and mouth. A first portion 412 of the support 410 above the first part 422 of the aperture 420 is disposed against the user's forehead to provide mechanical support thereto. Second portions 414, 416 of the support 410 are disposed against the sides (e.g., cheeks) of the user's face to provide mechanical support thereto. A third portion 418 of the support 410 is disposed against the bottom of the user's face (e.g., chin) to provide mechanical support thereto. The stretchable support 410 can be made out of an elastic, nylon, LYCRA®, spandex, or the like.

A chest support 425 is disposed at a second end 418 of the support 410. The chest support 425 can include a cushion, a rubberized material, or similar device for mechanically supporting the user's chest. The chest support 425 can be adjustable and/or removable to provide a degree of freedom.

The frame 400 includes first and second sections 430, 440. Each section 430, 440 includes a respective base portion 432, 442, a respective front stand portion 434, 444, a respective rear stand portion 436, 446, and a respective support portion 438, 448. The base portions 432, 442 are disposed against a surface 450 such as the ground or tabletop (e.g., a tray tabletop) to mount the bodyrest 40 for use. The base portions 432, 442 are connected together at respective distal ends 435, 445 with a coupling 465 such as a wire. The coupling 465 can enhance the mechanical strength of the frame 400.

The front stand portions 432, 442 and rear stand portions 436, 446 are coupled to the respective base portions 432, 442 and to the respective support portions 438, 448. In general, the front stand portions 432, 442 have a first height 460 and the rear stand portions 436, 446 have a second height 470, which is less than the first height 460. The front stand portions 432, 442 and rear stand portions 436, 446 provide mechanical support and alignment for a height and an angle of the respective support portions 438, 448. The support portions 438, 448 extend at a reclined angle from the first height 460 to the second height 470 to generally align with the user's chest and head in a forward-leaning position. The support portions 438, 448 mechanically support the stretchable support 410 similar to a hammock.

Figure 4:
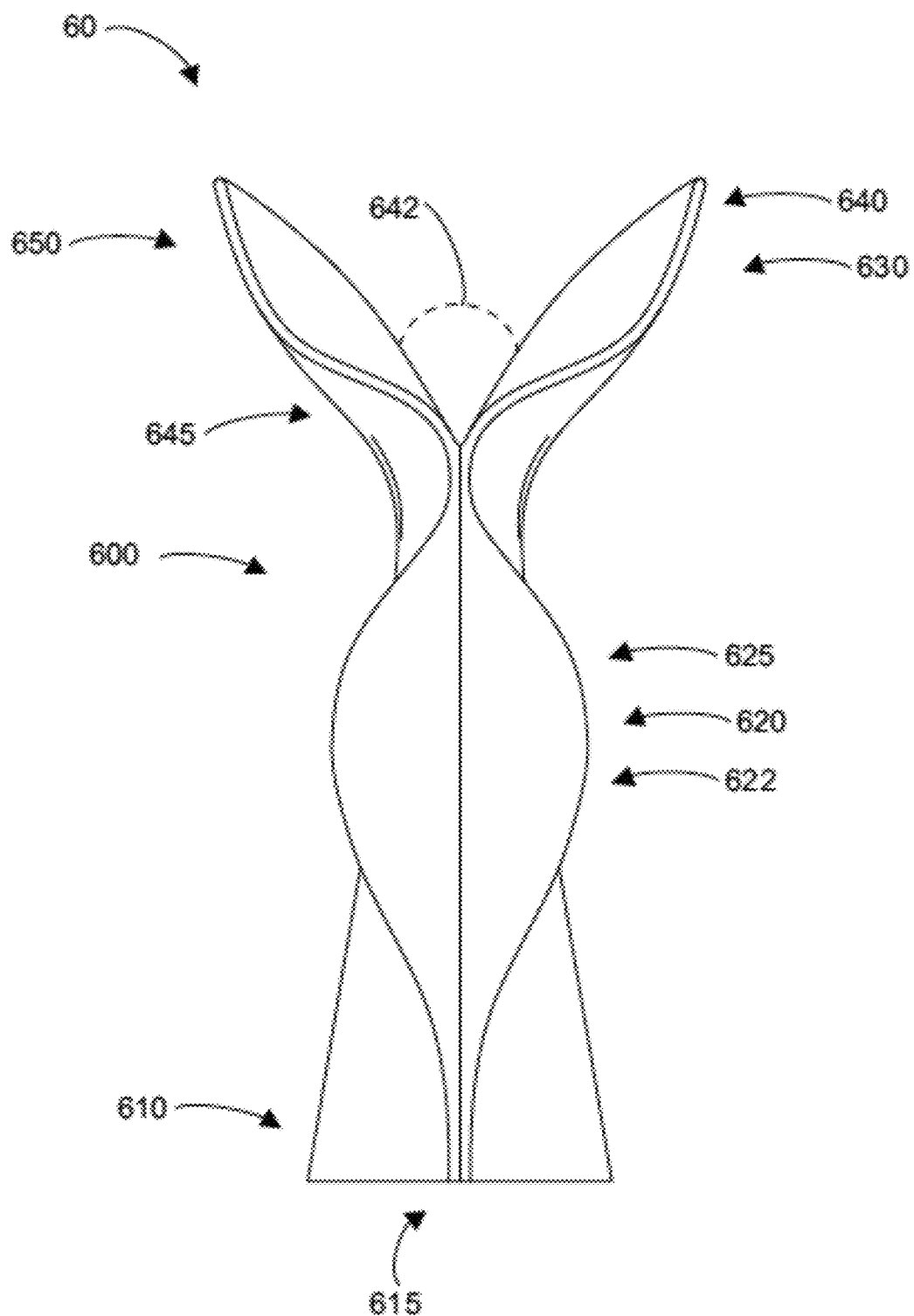
FIG. 4 illustrates a front view of a bodyrest according to an embodiment.

FIG. 4 illustrates an embodiment of a bodyrest 60 for a user seated in a forward-leaning position. The bodyrest 60 includes a generally elongated body 600 having a base 610, a chest support 620, and a head support 630. The base 610 has an exposed surface 615 that is generally planar for supporting the body 600 on a flat surface such as a tabletop, an airplane tray table, etc. The bodyrest 60 can be a personal support apparatus and/or a personal rest system.

The chest support 620 has an exposed surface 622 and a generally curved edge 625. The exposed surface 622 is positioned against a user's chest to provide support thereto. The chest support 620 can include a cushion and/or a rubber-like material for supporting the user's chest when the user is seated in a forward-leaning position. The chest support 620 can provide additional comfort to the user by supporting a portion of the user's weight. The chest support 620 and body 600 can have a curved profile, which can conform to a user's chest and/or upper body when the user is seated in a forward-leaning position. In some embodiments, the chest support 620 is adjustable and/or removable to provide a degree of freedom.

The head support 630 includes a first support arm 640 and a second support arm 650. The first and second support arms 640, 650 are disposed at an angle 642 with respect to one another to form a structure similar to a V. A chin support 645 is formed at the intersection of the support arms 640, 650 (i.e., at the vertex of the "V"). The support arms 640, 650 are aligned with opposing sides of a user's face to provide support thereto when the user is seated in a forward-leaning position. The support arms 640, 650 can be aligned with the user's cheeks, jawbone, forehead, and/or another portion of the front and/or side of the user's head. The support arms 640, 650 are moveable towards or away from each other to adjust a position of the support arms 640, 650 on the user and to provide a degree of freedom.

Figure 5:
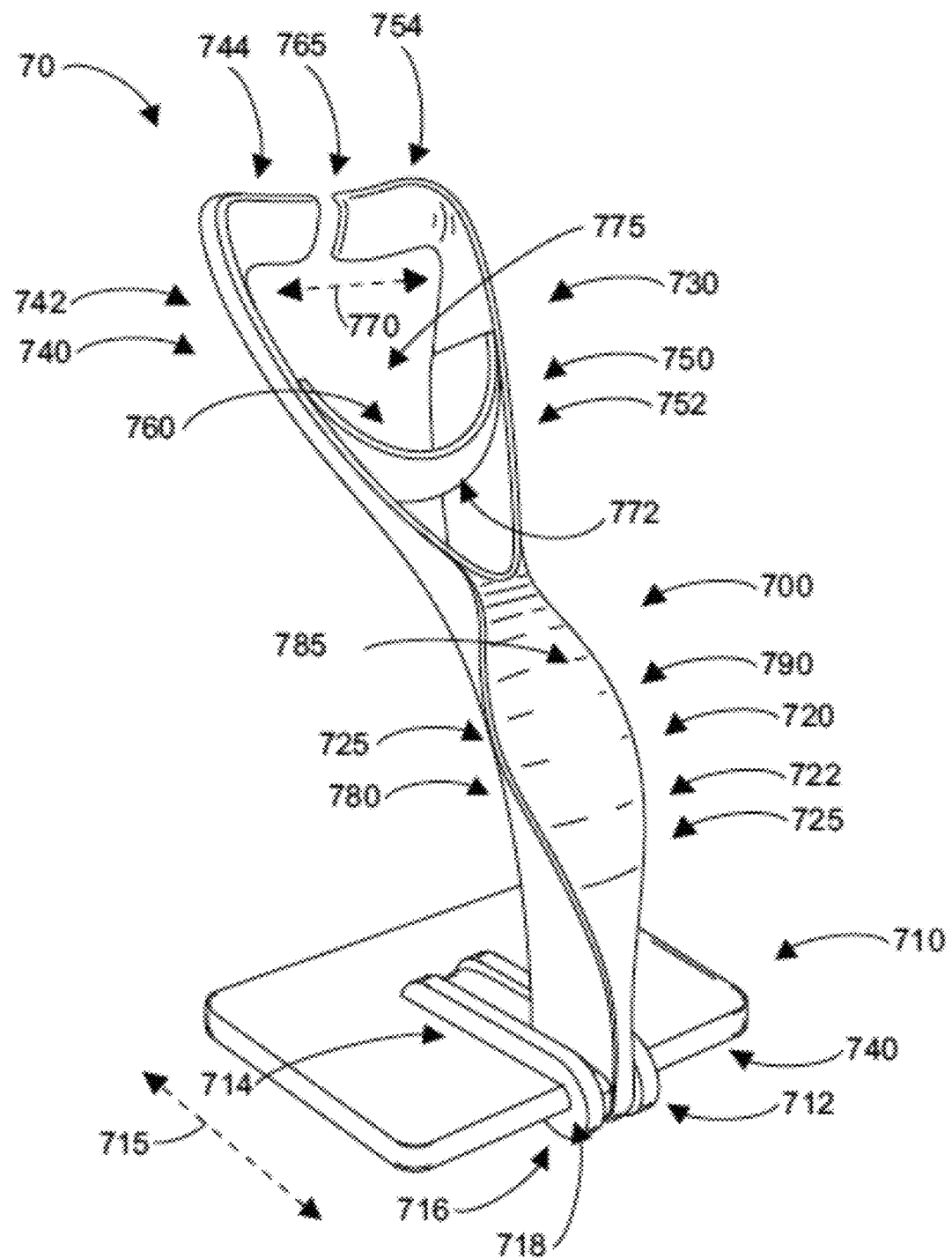
FIG. 5 illustrates a perspective view of a bodyrest according to an embodiment.

FIG. 5 illustrates an embodiment of a bodyrest 70 for a user seated in a forward-leaning position. The bodyrest 70 can be a personal support apparatus and/or a personal rest system.

The bodyrest 70 includes a body 700 connected to a base 710. The base 710 includes a U-shaped attachment member 712 comprising a top portion 714 and a bottom portion 716. The top portion 714 and bottom portion 716 define an open channel 718 to receive an edge 740 of a table, an airplane tray table, etc. on which the bodyrest 70 is placed. The open channel 718 faces away from the user when the user uses the bodyrest 70 so that the user pushes the base 710 against the edge 740 of the table. Thus, the open channel 718 can anchor or mount the bodyrest 70 to the edge 740 of the table. In some embodiments, at least a portion of the open channel 718 is narrower than the edge 740 of the table such that the top and bottom portions 714, 716 of the attachment member 712 can mechanically grasp the edge 740 of the table.

The body 700 includes a chest support 720 and a head support 730. The chest support 720 has an exposed surface 722 and a generally curved edge 725. The exposed surface 722 is positioned against a user's chest to provide support thereto, as discussed above. The chest support 720 can include a cushion and/or a rubber-like material for supporting the user's chest when the user is seated in a forward-leaning position. The chest support 720 can provide additional comfort to the user by supporting a portion of the user's weight. The chest support 720 can have a curved profile, which can conform to a user's chest and/or upper body when the user is seated in a forward-leaning position. The chest support 720 can be adjustable and/or removable as discussed above.

The head support 730 includes a first support arm 740, a second support arm 750, and a chin support 760. The first and second support arms 740, 750 are configured to support opposing sides of the user's face and a top of the user's face (e.g., the forehead) when the user is seated in a forward-leaning position. The support arms 740, 750 include respective vertical portions 742, 752, and horizontal portions 744, 754. The vertical portions 742, 752 can generally align with opposing sides of the user's face, as described above. The horizontal portions 744, 754 generally align with the top of the user's face. The horizontal portions 744, 754 define a gap 765 therebetween, which allows the arms 740, 750 to flex inwardly or outwardly along a direction 770 parallel to the horizontal portions 744, 754. By flexing the arms 740, 750, the head support 730 can adjust to accommodate users with different head sizes.

The chin support 760 is a curved structure that extends from the first support arm 740 to the second support arm 750. The curve 772 generally conforms to and aligns with the user's chin.

The arms 740, 750 and the chin support 760 define an aperture 775. The aperture 775 is generally aligned to a user's face when the user is seated in a forward-leaning position. For example, the user's mouth, nose, and/or eyes can be aligned with the aperture 775. The aperture 775 provides an air path for the user and it allows the user to do various activities such as speak, sleep, read, look at a computer or tablet, etc. while using the bodyrest 70.

In some embodiments, the body 700 is adjustable along a length 715 of the base 710 to move of the body 700 towards or away from the user. In some embodiments, a screw is disposed in the top portion 714 and/or the bottom portion 716 of the base 710 to enhance the mechanical coupling of the base 710 and/or the attachment member 712 to the edge 740 of the table.

For storage, the body 700 and base 710 can split into first and second halves 780, 790 along a central seam 785. The central seam 785 extends to the chin support 760 and is aligned with the gap 765 between the arms 740, 750. A securing mechanism (e.g., one or more screws) secures the halves 780, 790 together when the bodyrest 70 is in use.

Figure 6:
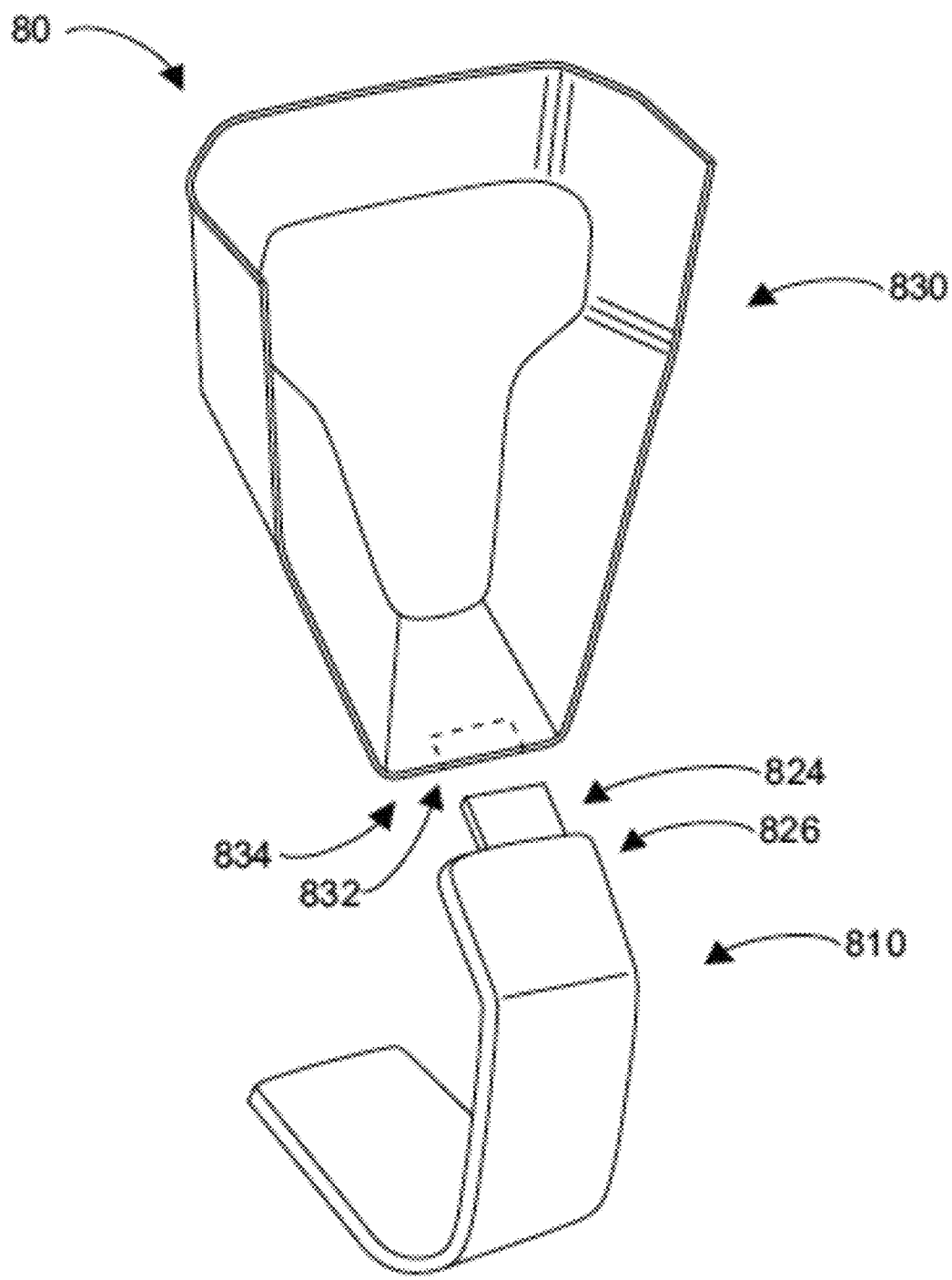
FIG. 6 illustrates a perspective view of a bodyrest according to an embodiment.

FIG. 6 illustrates a perspective view of an embodiment of a bodyrest 80 for a user seated in a forward-leaning position. The bodyrest 80 can be a personal support apparatus and/or a personal rest system.

The bodyrest 80 includes a base 810 mechanically connected to a head support 830. The base 810 includes a stand portion 812, a vertical portion 814, and an inclined portion 816. The vertical portion 814 is disposed between the stand portion 812 and the inclined portion 816. The stand portion 812 is generally planar to conform to a tabletop, a top surface of an airplane tray table, or similar mounting surface. The vertical portion 814 extends along a height 820 that is approximately orthogonal to a plane 818 defined by the stand portion 812. An optional chest support 825 is disposed on the vertical portion 814. The inclined portion 816 is disposed at approximately a 45-degree angle with respect to the height 820 of the vertical portion 814. It is noted that the inclined portion 816 can be disposed at other angles with respect to the height 820, such as 15 degrees, 30 degrees, 60 degrees, or 75 degrees.

A male connector 824 is disposed at a distal end 826 of the inclined portion 816. When the bodyrest 80 is in an assembled configuration the male connector 824 is disposed in a recess 832 defined in a proximal end 834 of the head support 830 to mechanically connect the head support 830 with the base 810. Likewise, the head support 830 and base 810 can be separated (e.g., for storage or travel) by removing the connecter 824 from the recess 832.

The head support 830 comprises a generally annular body 835 shaped to conform to a user's face while seated in a forward-leaning position. The body 835 includes a lower portion 840, side portions 845, and an upper portion 850. The lower portion 840 can be aligned with a user's chin when the user is seated in a forward-leaning position. The side portions 845 can be aligned with respective sides of a user's face (e.g., cheeks) when the user is seated in a forward-leaning position. The upper portion 850 can be aligned with the top of a user's head (e.g., forehead) when the user is seated in a forward-leaning position. A temple support portion 855 can extend from the upper portion 850 towards the user to support a user's temple. An aperture 860 is defined by the annular body 835. The aperture 860 can be aligned with one or more sensory organs on the user's face, such as the eyes, nose, and/or mouth.

Figure 7A:
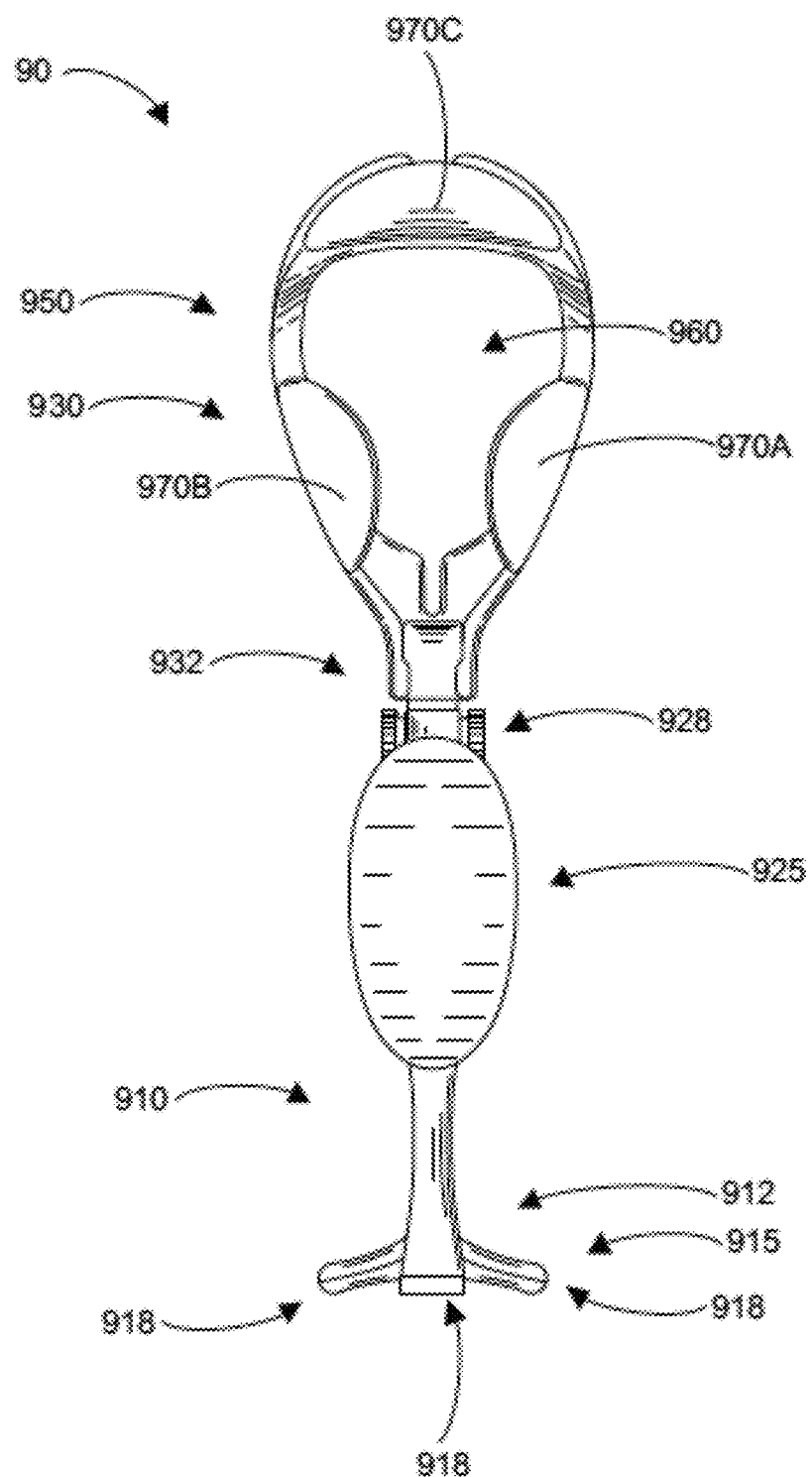
FIG. 7A illustrates a front view of a bodyrest according to an embodiment.

FIG. 7 illustrates an embodiment of a bodyrest 90 for a user seated in a forward-leaning position. The bodyrest 90 can be a personal support apparatus and/or a personal rest system.

Figure 7B:
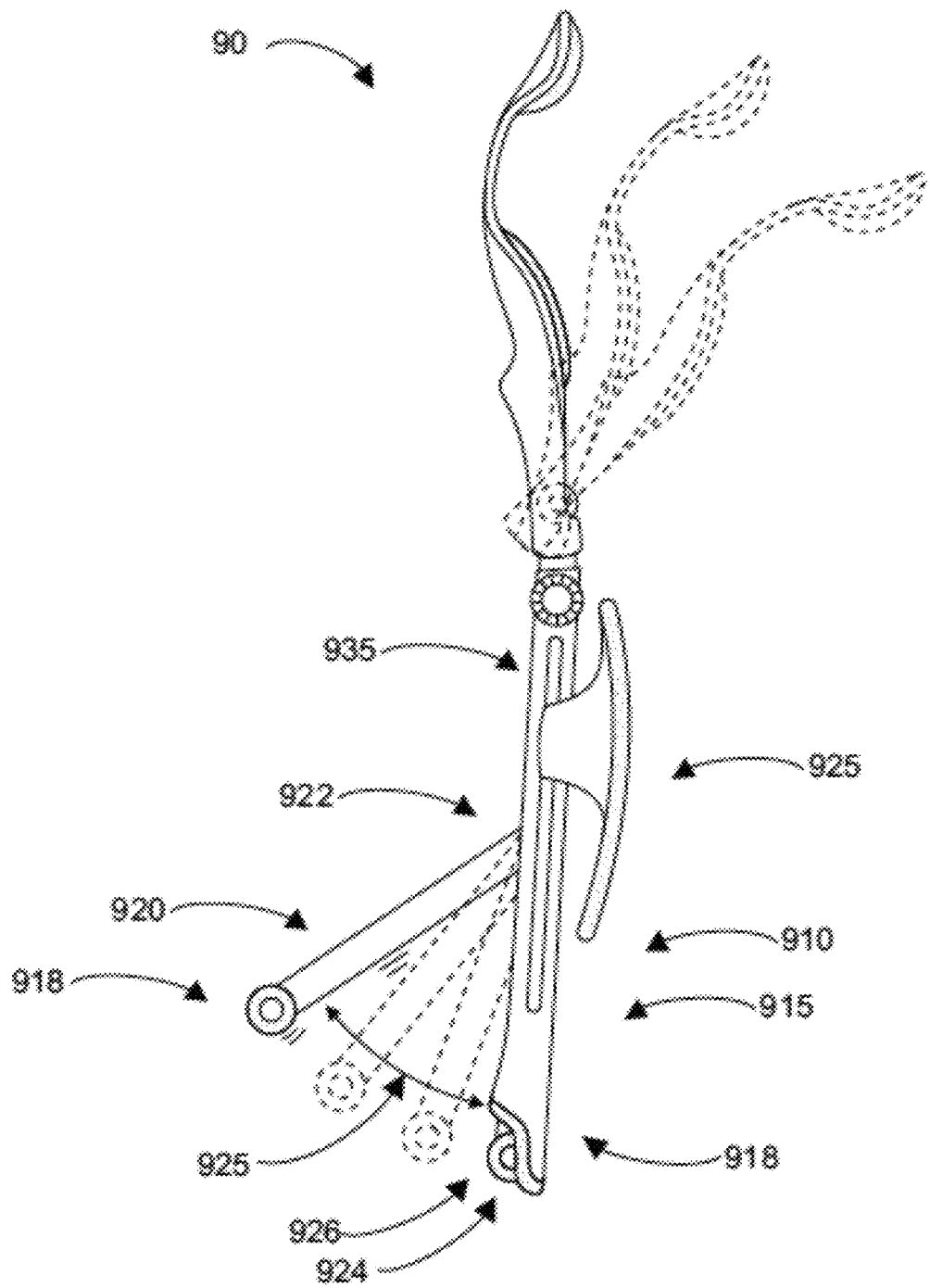
FIG. 7B illustrates a side view of a bodyrest according to an embodiment.

The bodyrest 90 includes an elongated body 910 that is mechanically coupled to a head support 930. The body 910 includes a support stand 915 disposed at a first end 912 of the body. The support stand 915 is formed of multiple legs 918. Some of the legs 918 are disposed on an optional secondary support arm 920 as illustrated in FIG. 7B, which shows a side view of the bodyrest 90. At least one leg 918 includes an optional notch 924 to conform the leg 918 to an edge 926 of a table or similar working surface.

Returning to FIG. 7B, a proximal end 922 of the secondary support arm 920 is rotatably coupled to the body 910 as indicated by arrow 925. The secondary support arm 920 can rotate from a first position where the secondary support arm 920 is approximately parallel to the body 910 to a second position where the secondary support arm 920 is disposed at approximately about a 45-degree angle with respect to the body 910. Those skilled in the art will recognize that the secondary support arm 920 can be adjustably disposed at a wide range of angles with respect to the body 920, as indicated by the arrow 925, including 15 degrees, 30 degrees, 60 degrees, 75 degrees, 90 degrees, or any angle therebetween. In some embodiments, the secondary support arm 920 can lock at one or more angles to customize the angle of the secondary support arm 920 and/or the body 910 to provide a degree of freedom for the bodyrest 90.

A chest support 925 is disposed on the body 910. The chest support 925, as discussed above, provides support to a user's chest and upper body while using the bodyrest 90. The chest support 925 is optionally adjustable along a length of the body 910 in a groove 935 to provide an additional degree of freedom for the bodyrest 90. The chest support 925 can be locked at given height/position with a knob 928 or similar device (e.g., a screw, a clamp, etc.).

Returning to FIG. 7A, the head support 930 includes an annular frame 950 that defines an aperture 960 that aligns with a user's face, as discussed above. A plurality of support pads 970A-C are disposed on the frame 950. The pads 970A-C are aligned with certain features of a user's face, such as the user's cheeks (e.g., pads 970A, B) and forehead (e.g., pad 970C). The pads 970A-C can be adjustable along the frame 950, for example using a hook-and-loop fastener (e.g., Velcro®), an adhesive, a peg, straps, clasps, hooks, magnetic fasteners (e.g., magnetic clasps and/or magnetic snaps) or other attachment mechanism etc. In addition, the head support 930 is optionally pivotably connected to the base 910 at a joint 932. Using the joint 932, the head support 930 can pivot towards or away from the chest support 925, as illustrated in FIG. 9B. The pivot angle of the head support 930 can be locked into place using a tightening mechanism, such as a screw. For a more compact, stowed configuration, the head support 930 can pivot 180 degrees towards the chest support 925 so that the head support 930 is disposed against the chest support 925.

FIGS. 8A-8I illustrate various perspectives of a body support 1000. The body support 1000 can be a personal support apparatus and/or a personal rest system.

Figure 8A:
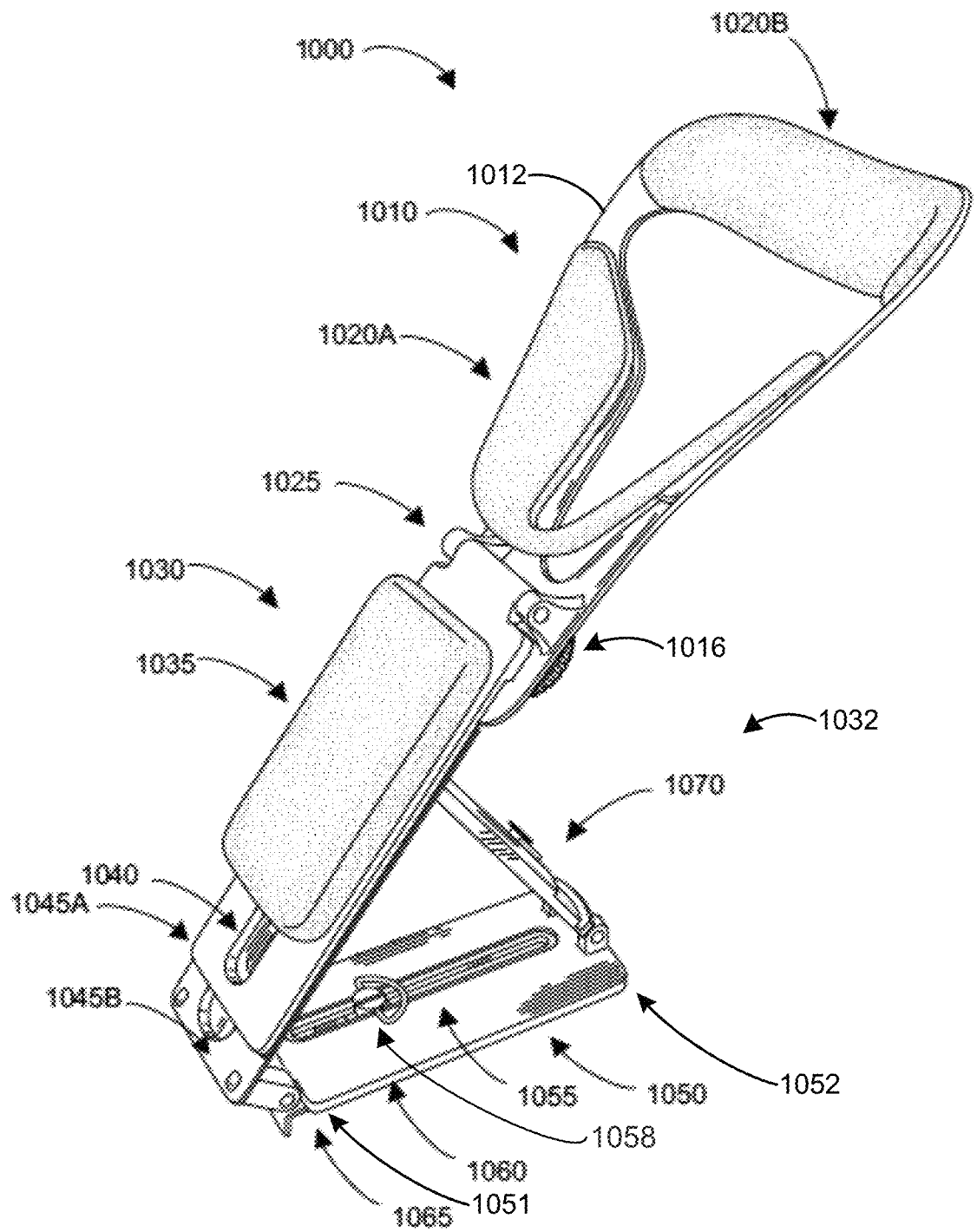
FIG. 8A illustrates a perspective view of a body support according to an embodiment.
Figure 8B:
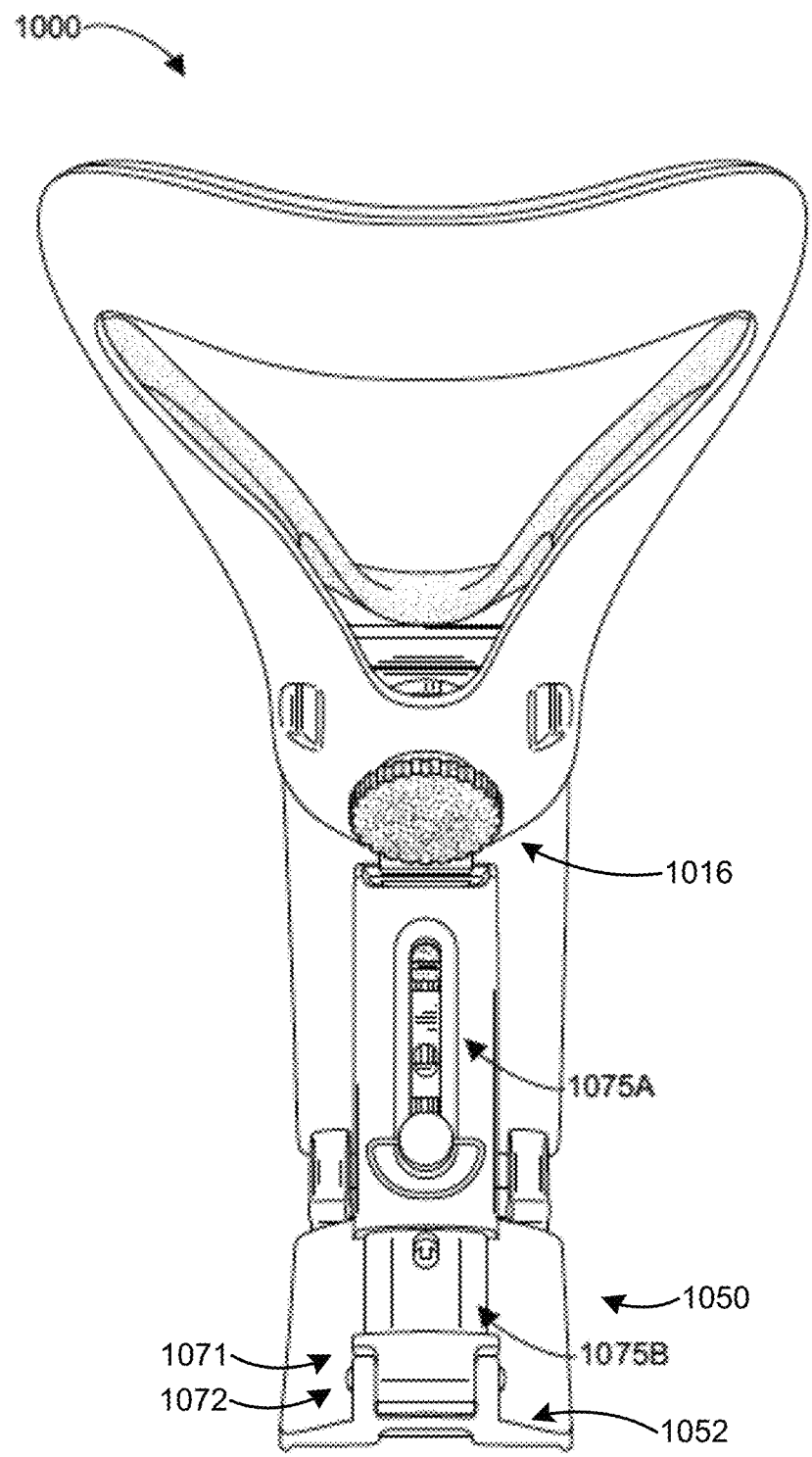
FIG. 8B illustrates a rear view of a body support according to an embodiment.
Figure 8C:
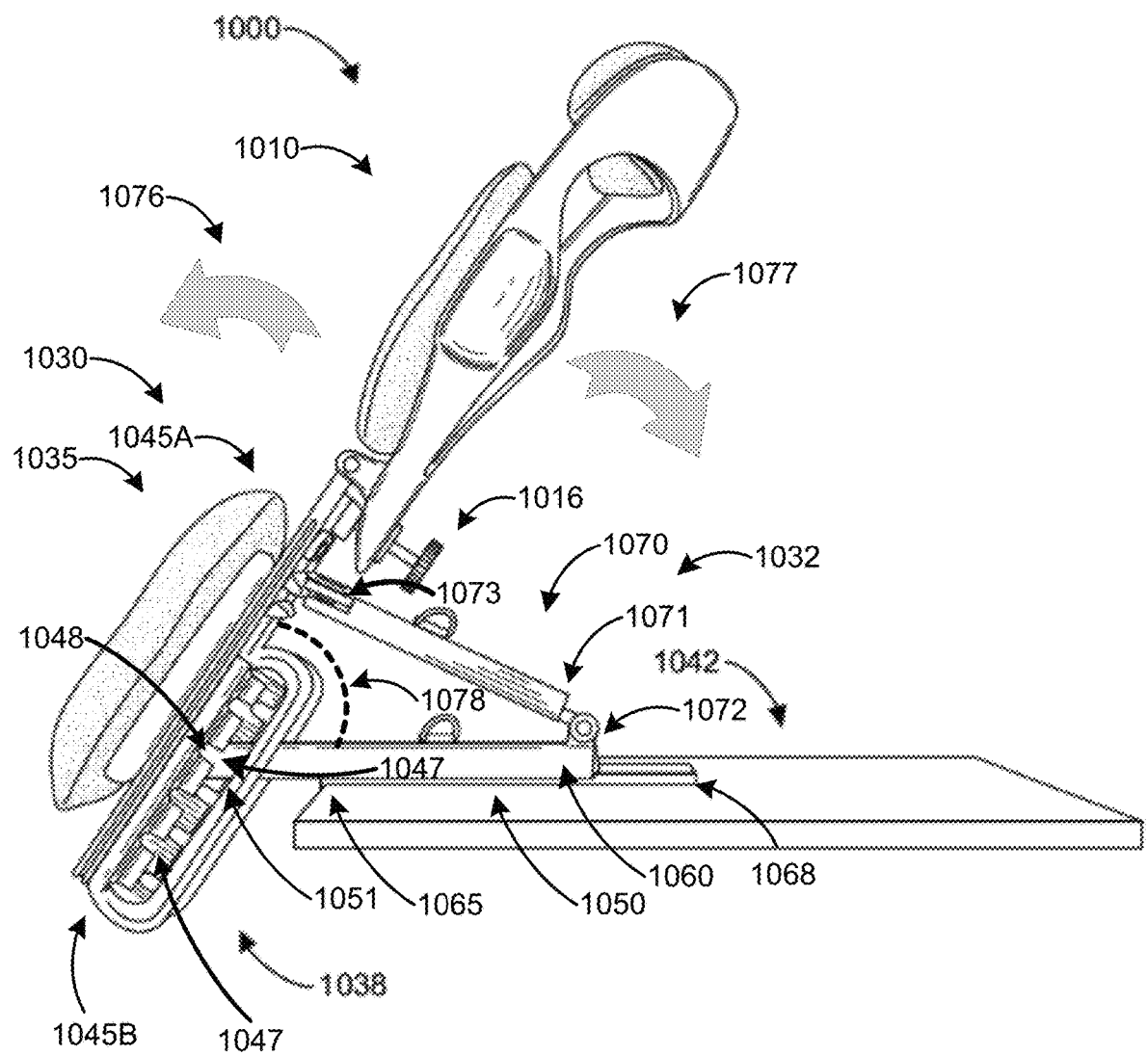
FIG. 8C illustrates a side view of a body support according to an embodiment.
Figure 8D:
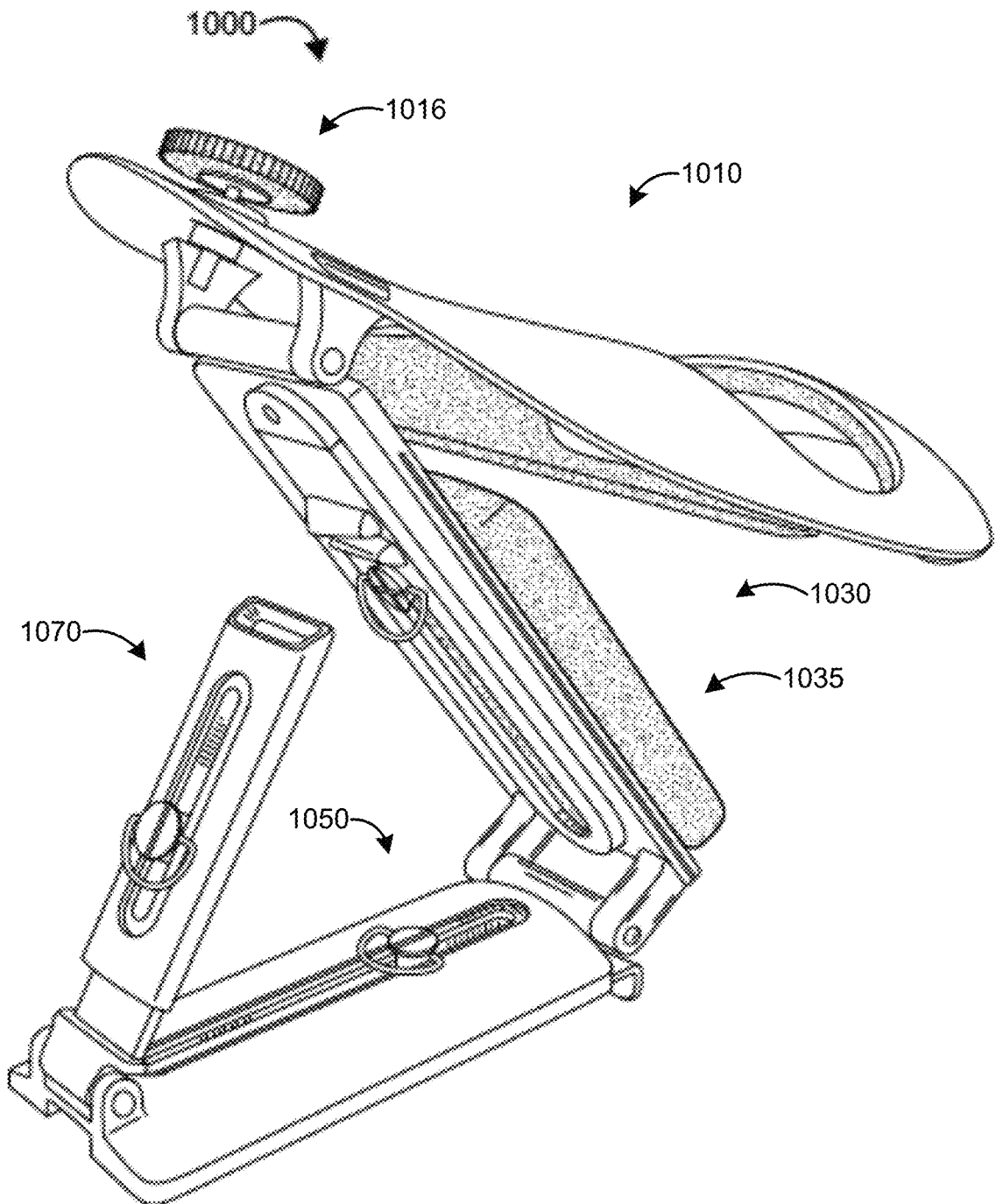
FIG. 8D illustrates a perspective view of a body support according to an embodiment.
Figure 8E:
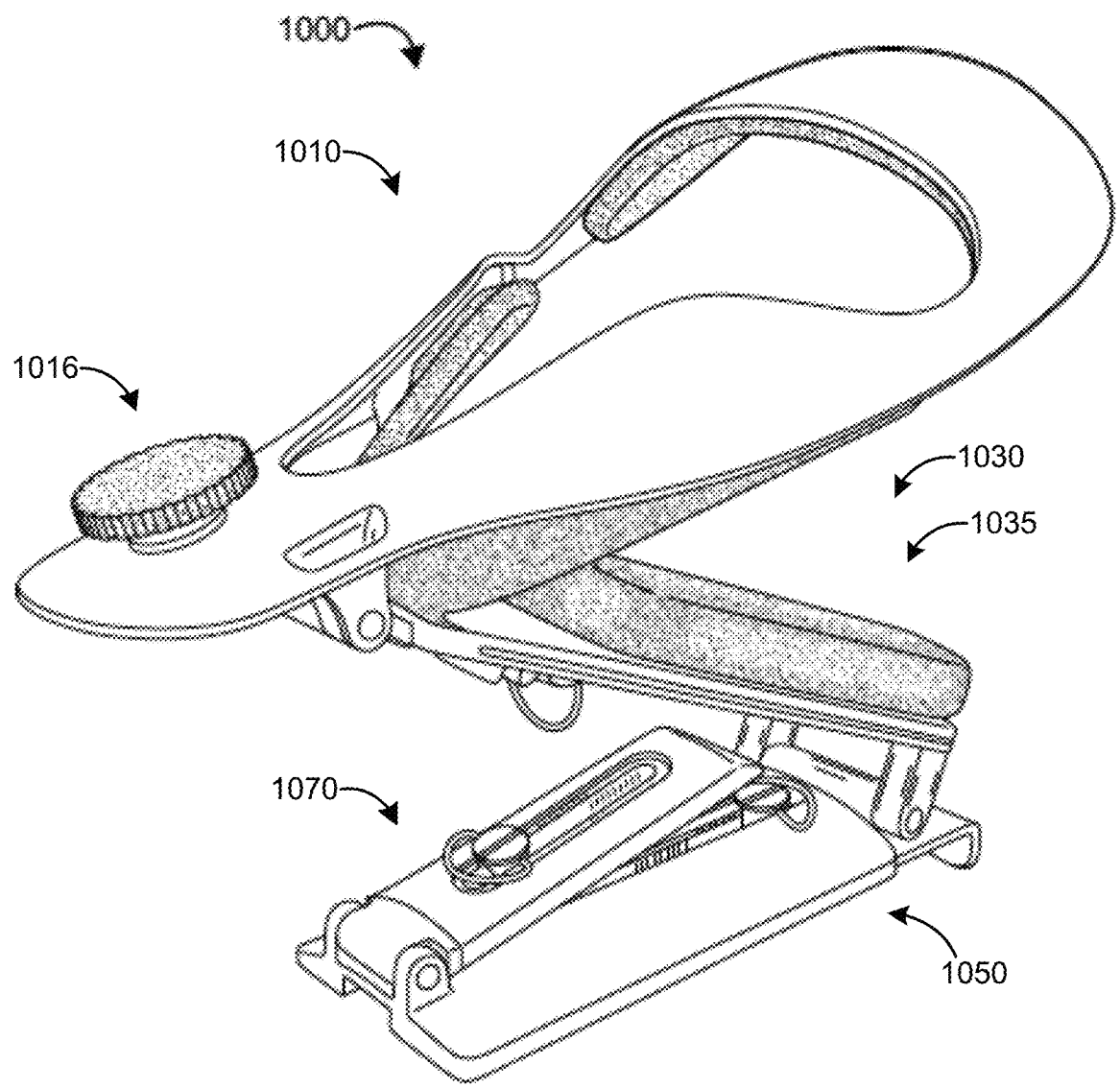
FIG. 8E illustrates a perspective view of a body support according to an embodiment.
Figure 8F:
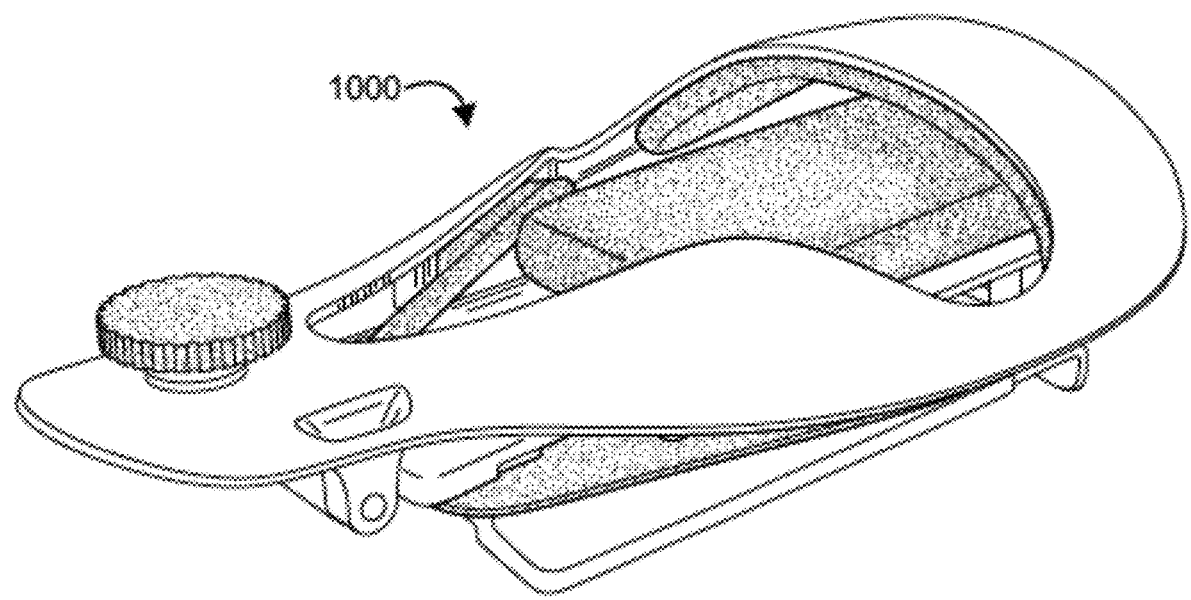
FIG. 8F illustrates a perspective view of a body support according to an embodiment.

The body support 1000 includes various adjustable components for customization in various degrees of freedom. The body support 1000 includes a head support 1010 having a frame 1012. Pads 1020A, 1020B are mounted on the frame 1012 to support the user's face (e.g., chin and forehead). The frame 1012 is attached to a stand 1032 that includes a chest support arm 1030 and a pivot angle adjustment arm 1070. The frame 1012 is pivotably attached to a first end of the chest support arm 1030 at a pivot point 1025 thus allowing the frame 1012 to fold towards the chest support arm 1030 for storage (e.g., as illustrated in FIGS. 8D-F). In addition, the frame 1012 can be pivoted towards or away from the chest support arm 1030 to adjust the angular orientation of the head support 1010 with respect to the chest support arm 1030. A frame pivot knob 1016 can be rotated to advance or retract a threaded member (e.g., a screw or bolt) that provides a backstop against the first end of the chest support arm 1030 to set the angular orientation of the frame 1012, which corresponds to the angular position that the head support 1010 supports the user's head when it is disposed in the head support 1010. The head support 1010 can also pivot inwardly (e.g., towards chest support arm 1030) so that it is disposed against the chest support arm 1030 to transition to the body support 1000 to a stowed configuration, as discussed below.

The head support 1010, pads 1020A, 1020B, and/or frame 1012 can include a receptacle for an aromatherapy cartridge, as described below. The frame 1012 can comprise a thermoplastic material and can be formed by injection molding. The frame 1012 can have a thickness of about 0.125 inches to about 0.5 inches, including about 0.25 inches, and any thickness or thickness range between any two of the foregoing thicknesses. In some embodiments, the thickness can vary along the frame 1012. As used herein, "about" means plus or minus 10% of the relevant value.

The chest support arm 1030 includes a first plate 1045A and a second plate 1045B. A chest support cushion 1035 is attached (e.g., removably attached) to the first plate 1045A of the chest support arm 1030. The plates 1045A, 1045B can slide with respect to each other along groove 1040 to customize the length of (e.g., shorten or lengthen) the chest support arm 1030 to set the height of the chest support cushion 1035 (e.g., to align the chest support cushion 1035 with the user's sternum) and to set the height of the head support 1010 (e.g., to align the head support 1010 with the user's face when the user is in a forward-leaning position). This provides a customization degree of freedom. By adjusting the length of the chest support arm 1030, the body support 1000 can be adjusted to accommodate users of different heights (e.g., a longer chest support arm 1030 for a taller user). For example, increasing the length of the chest support arm 1030 (e.g., for a taller user), by sliding the first plate 1045A away from the second plate 1045B, causes the chest support cushion 1035 to move upwardly away from base 1050 to set the chest support cushion 1035 at a first chest support height. In addition, increasing the length of the chest support arm 1030 causes the head support 1010 to move upwardly away from base 1050 to set the head support 1010 at a first head support height. In contrast, decreasing the length of the chest support arm 1030 (e.g., for a shorter user), by sliding the first plate 1045A towards the second plate 1045B, causes the chest support cushion 1035 and the head support 1010 to move downwardly towards the base 1050. Decreasing the length of the chest support arm 1030 sets the chest support cushion 1035 at a second chest support height and sets the head support 1010 at a second head support height, where the first chest support height is greater than the second chest support height and the first head support height is greater than the second head support height.

Figure 8G:
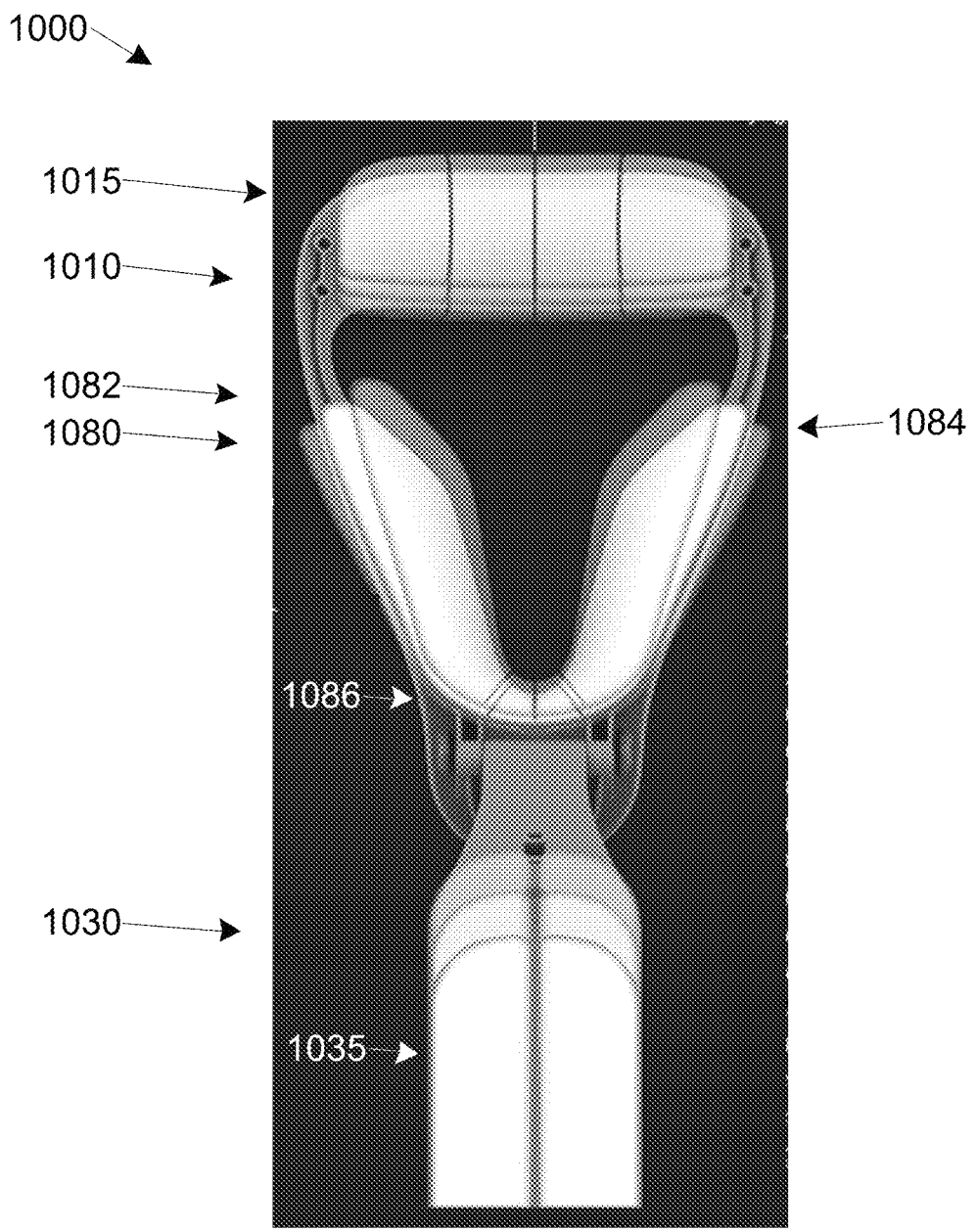
FIG. 8G is a detailed view of head support and body according to one or more embodiments.
Figure 8H:
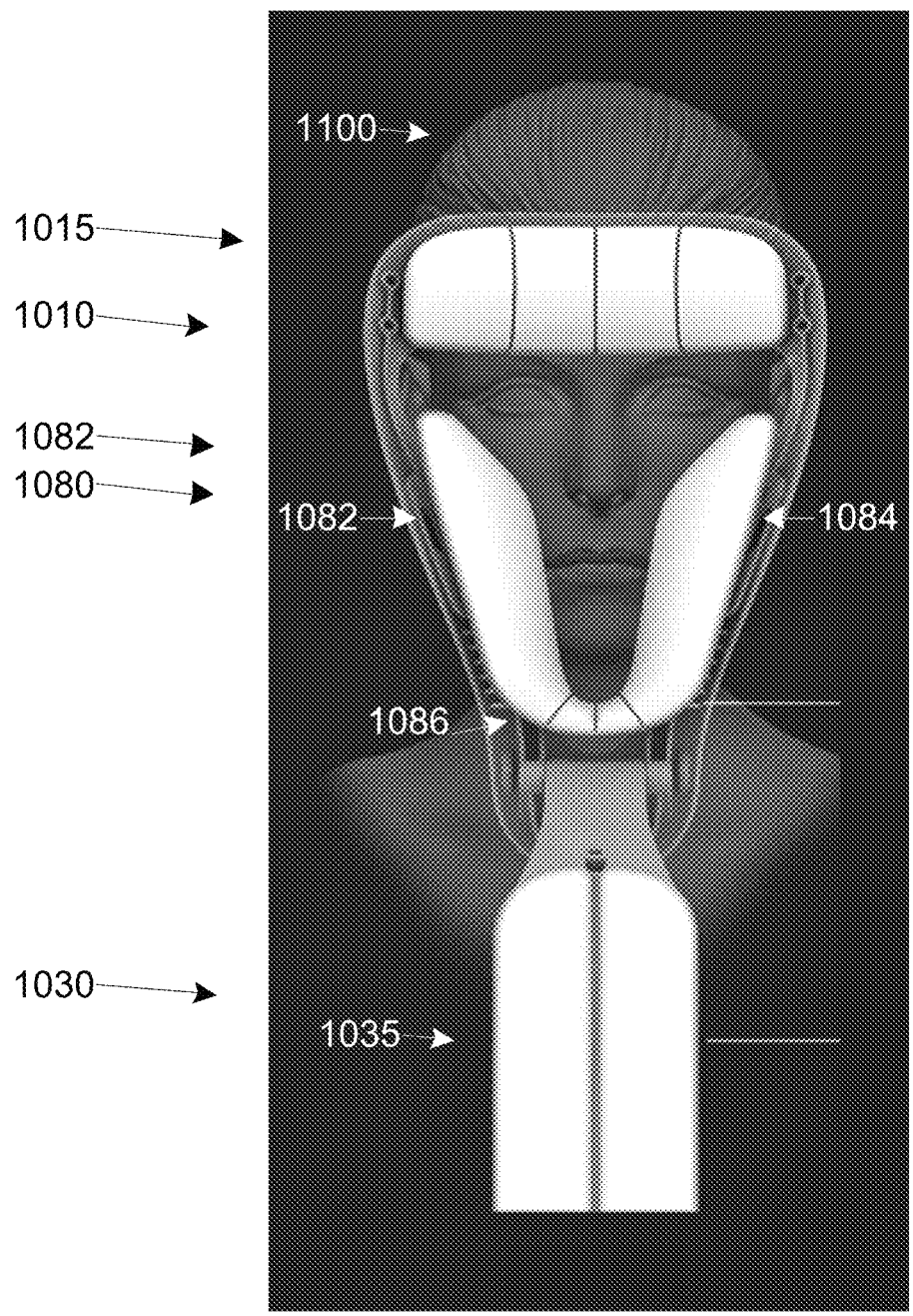
FIG. 8H illustrates the head support and body in use with a person having a small head size.
Figure 8I:
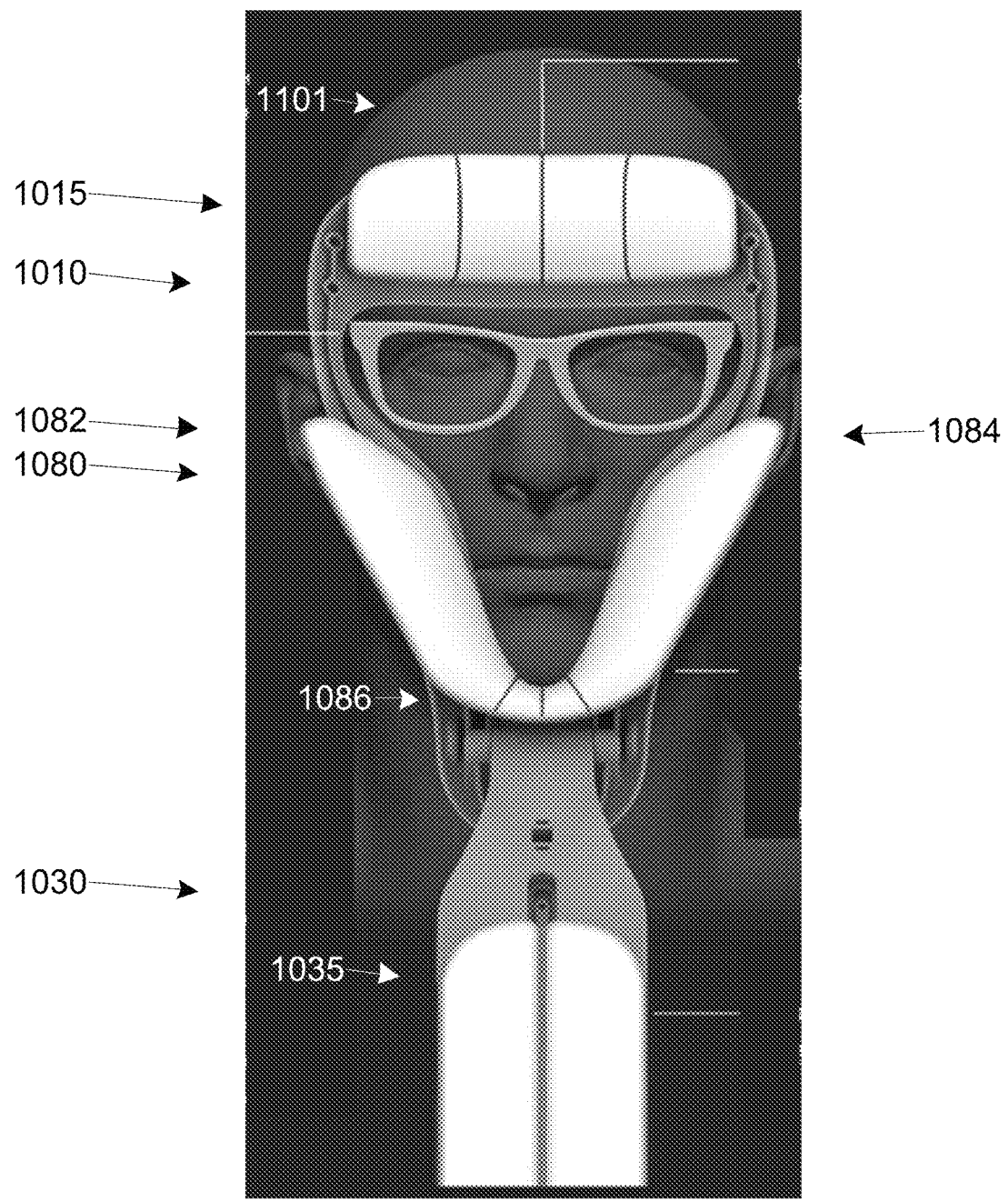
FIG. 8I illustrates the head support and body in use with a person having a small head size.
Figure 8J:
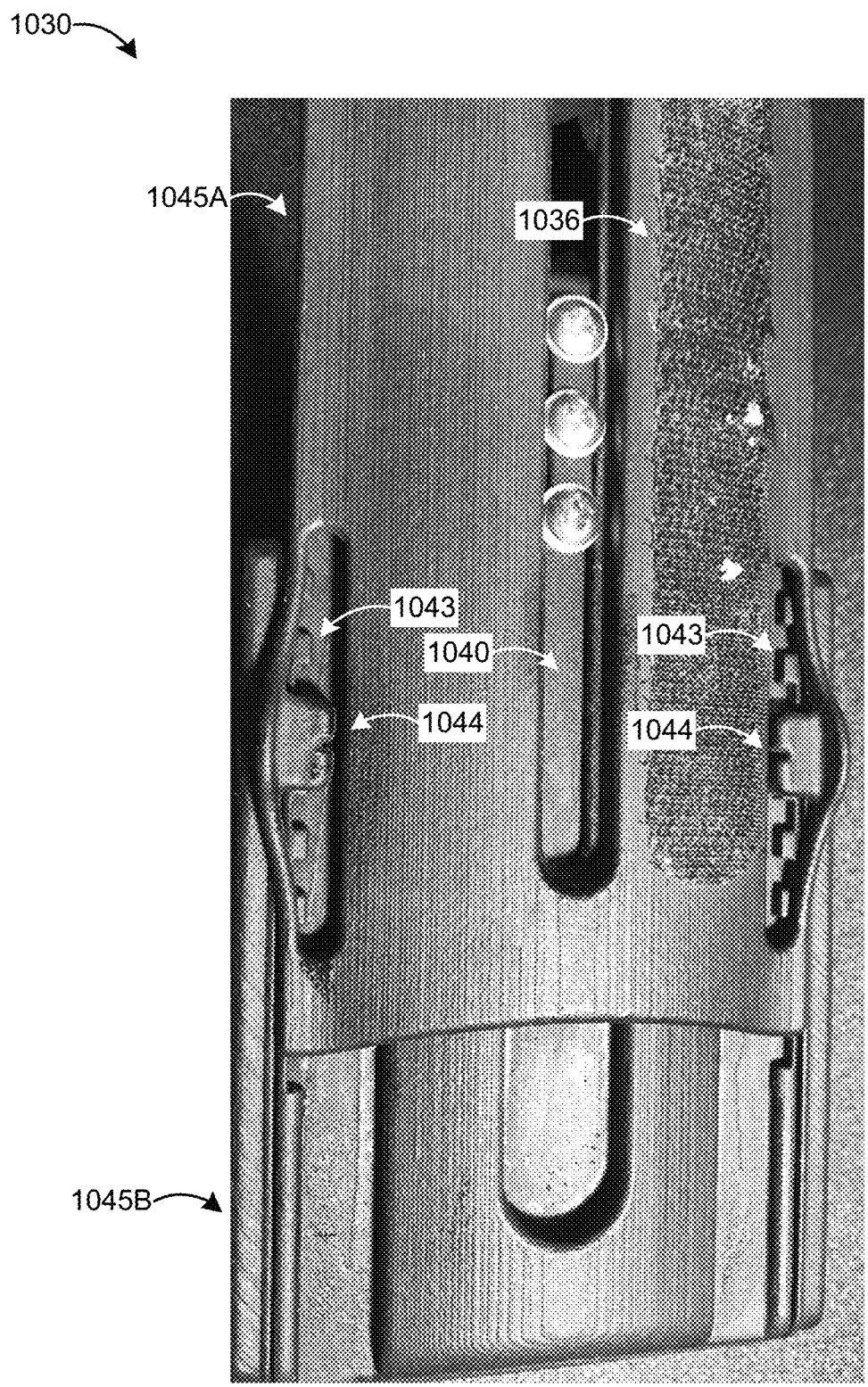
FIG. 8J is a detailed view of the chest support arm according to one or more embodiments.

In an alternative embodiment, the chest support arm 1030 includes a releasable engagement mechanism that includes a plurality of notches 1043 on the opposing sides of the second plate 1045B and a pair of latches or pawls 1044 on the first plate 1045A, as illustrated in FIG. 8J. Pressing the latches or pawls 1044 inwardly releases the releasable engagement mechanism to allow the first and second plates 1045A, 1045B to slide with respect to each other. FIG. 8J also illustrates a hook-and-loop strip 1036 that can be used to releasably attach the chest support cushion 1035 to the chest support arm 1030 (e.g., via a second hook-and-loop strip disposed on the back of the chest support cushion 1035).

Figure 8K:
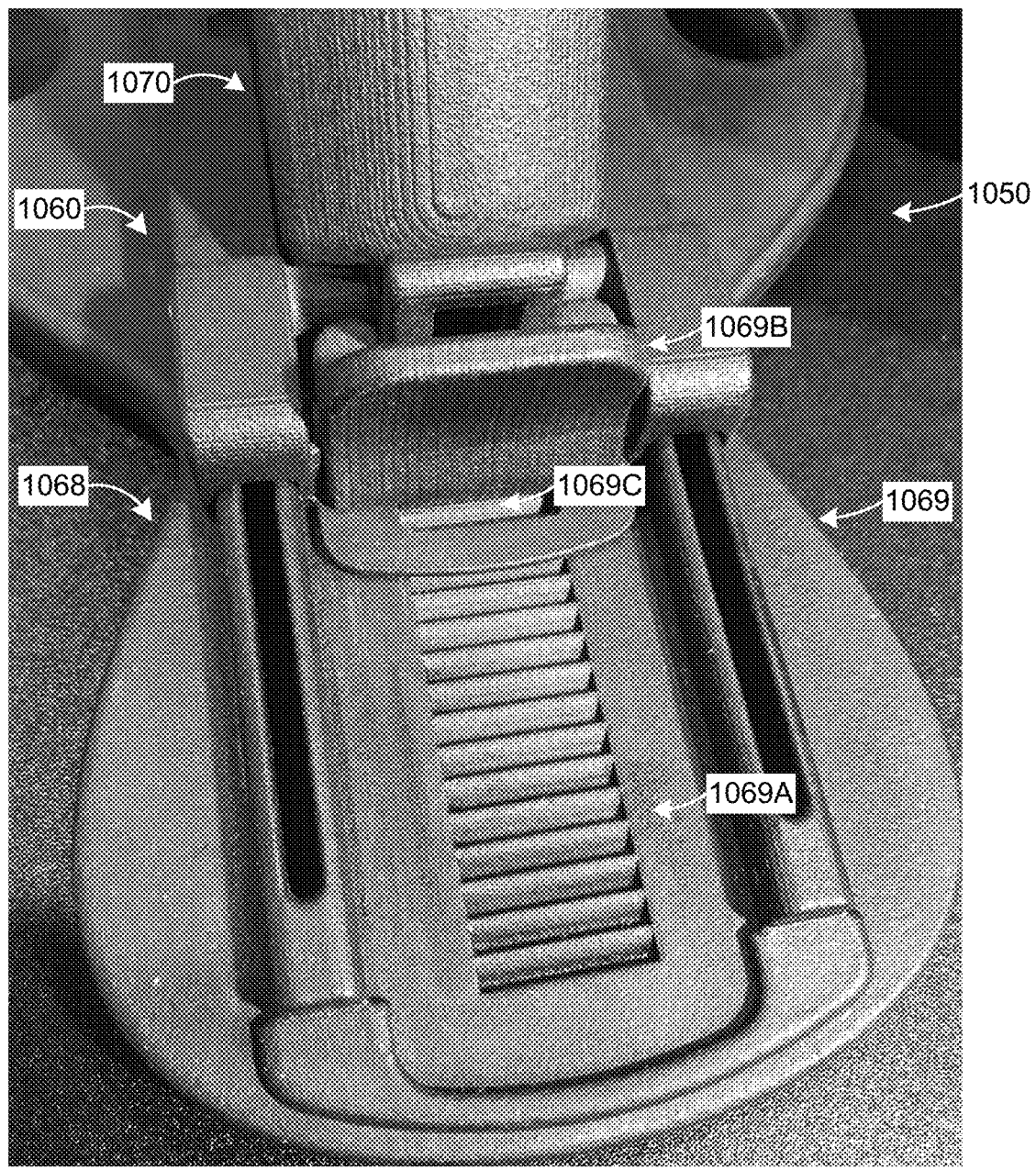
FIG. 8K is a detailed view of the base according to one or more embodiments.

The chest support arm 1030 is mechanically connected to a first end 1051 of an adjustable base 1050. The base 1050 defines a groove 1055 for sliding a base plate 1060 with respect to a clamp 1065, which is configured to attach to a table or working surface. The clamp 1065 can be disposed at the end of a clamp base 1068. Thus the base plate 1060 can be slideably positioned with respect to the clamp 1065 and the clamp base 1068. By adjusting the base 1050, the chest support 1035 and the head support 1010 can be positioned towards or away from a user, which provides another customization degree of freedom. A pin 1058 extends from the base 1050 to slide/adjust the base plate 1060 as described above. In an alternative embodiment, the base plate 1060 can be adjusted with respect to the clamp base 1068 with a slide lock 1069, for example as illustrated in FIG. 8K. The slide lock 1069 includes a plurality of grooves or detents 1069A and a button or lever 1069B that includes a projection 1069C that releasably engages the grooves or detents 1069A.

In some embodiments, the base 1050 can slide away from the clamp 1065 and the table/working surface (and towards the user). The base 1050 can overhang the table/working surface to allow the chest support arm 1030 to slide (e.g., using saw tooth mechanism 1038) below a plane defined by a top surface 1042 of the table or the working surface as illustrated in FIG. 8C.

The saw tooth mechanism 1038 includes a projection 1048 at the first end 1051 of base 1050 that is removably received by one of a plurality of grooves or recesses 1047 that are defined on the back of the second plate 1045B of chest support arm 1030. The projection 1048 can include a metallic or thermoplastic cylinder, bar, or other shape that is sized and arranged to snugly fit within grooves or recesses 1047. Using saw tooth mechanism 1038, the chest support arm 1030 can be adjustably attached to the first end 1051 of the base 1050 along some or all of the length of the second plate 1045B of chest support arm 1030. Thus, the attachment point of the chest support arm 1030 on the first end 1051 of the base 1050 can vary depending on which groove or recess 1047 receives the projection 1048. The saw tooth mechanism 1038 allows the chest support arm 1030 to be raised or lowered with respect to base 1050, which provides additional customization of the heights of the chest support cushion 1035 and of the head support 1010. This additional customization is independent of the customization provided by adjusting the length of the chest support arm 1030. For example, the saw tooth mechanism 1038 can be adjusted with the projection 1048 disposed in any of the grooves or recesses 1047 at the same time that the length of the chest support arm 1030 can be varied within its full range. This allows the chest support cushion 1035 and the head support 1010 to be set at a wide range of heights to provide a custom fit for a wide range of user heights (e.g., less than 5 feet to over 6 feet in height).

The pivot angle adjustment arm 1070 is disposed between the base 1050 and the chest support arm 1030 to provide mechanical support to and to set the pivot angle of the chest support arm 1030. The pivot angle adjustment arm 1070 can lengthen or shorten by sliding respective support arm members 1075A, 1075B (e.g., as illustrated in FIG. 8B) in a telescoping manner, which causes the chest support arm 1030 to pivot towards or away from the user, which also causes the chest support cushion 1035 and the head support 1010 to pivot towards or away from the user, which provides another customization degree of freedom. A lower end 1071 of the pivot angle adjustment arm 1070 is pivotably attached to the base 1050 (e.g., to a second end 1052 of base 1050) at pivot 1072. An upper end 1073 of the pivot angle adjustment arm 1070 is releasably attached to the chest support arm 1030 (e.g., to the back of first plate 1045A). The length of the pivot angle adjustment arm 1070 corresponds to the pivot angle 1078 of the chest support arm 1030 with respect to the base 1050, and the pivot angle 1078 corresponds to the angular orientation of the chest support arm 1030, the chest support cushion 1035, and the head support 1010. The angular orientation of the head support 1010 can be further customized using frame pivot knob 1016, as discussed above. For example, increasing the length of the pivot angle adjustment arm 1070 causes the head support 1010, chest support arm 1030, and the chest support cushion 1035 to pivot away 1076 from the base 1050 (and towards the user) to increase the pivot angle 1078. In contrast, decreasing the length of the pivot angle adjustment arm 1070 causes the head support 1010, chest support arm 1030, and the chest support cushion 1035 to pivot towards 1077 the base 1050 (and away from the user) to decrease the pivot angle 1078. The upper end 1073 of the pivot angle adjustment arm 1070 can have a quick release attachment mechanism to the chest support arm 1030, which can allow the body support 1000 to be collapsed easily into a stowed configuration, as described below.

Figure 8L:
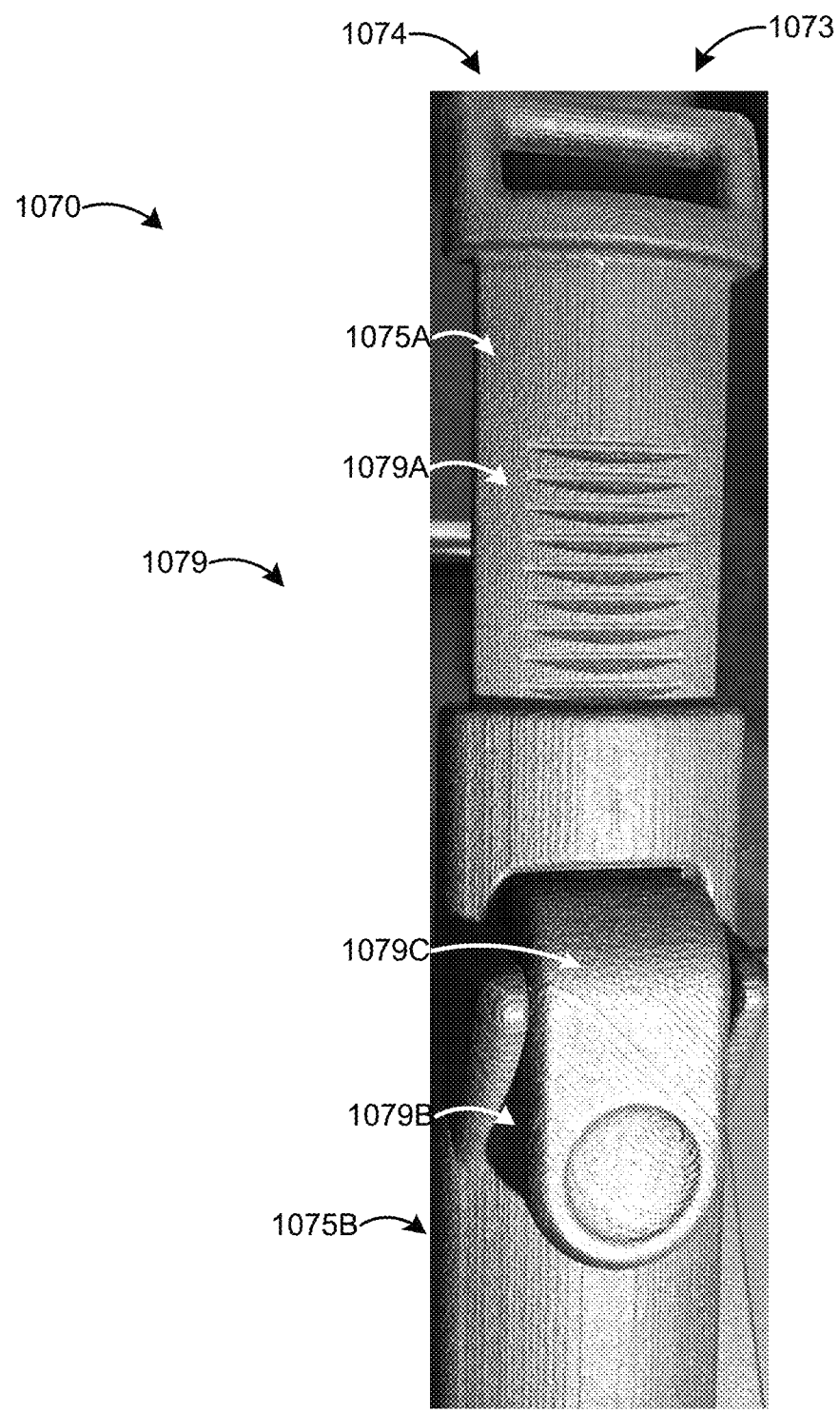
FIG. 8L is a detailed view of the pivot angle adjustment arm according to one or more embodiments.

In an alternative embodiment, the length of the pivot angle adjustment arm 1070 can be adjusted with a slide lock 1079, for example as illustrated in FIG. 8L. The slide lock 1079 includes a plurality of grooves or detents 1079A disposed on a first support arm 1075A and a button or lever 1079B on a second support arm 1075B that includes an engagement arm 1079C that releasably engages the grooves or detents 1079A. An open rectangular attachment member 1074 is disposed at the upper end 1073 of the pivot angle adjustment arm 1070. The open rectangular attachment member 1074 can be releasably attached to a corresponding recess or to a complementary rectangular attachment member on the back of the chest support arm 1030.

In some embodiments, a light source is integrated into or attached to the base 1050 and/or the stand 1032. A user can use the light source for reading, etc. while using the body support 1000.

The body support 1000 can collapse into a stowed configuration as illustrated in FIGS. 8D through 8F. To collapse, the pivot angle adjustment arm 1070 detaches from the chest support arm 1030, which allows the pivot angle adjustment arm 1070 and chest support arm 1030 to pivot inwardly towards the base 1050. In addition, the front of the head support 1010 pivots towards the chest support arm 1030 and chest support cushion 1035. In the stowed configuration, the head support 1010, the pivot angle adjustment arm 1070, the chest support arm 1030, and the base 1050 can be disposed substantially parallel to one other (e.g., within about 5° to about 15° of each other), as illustrated in FIG. 8F. The body support 1000 is substantially smaller (e.g., in the vertical direction) in the stowed configuration, which is advantageous for portability (e.g., during travel).

FIG. 8G is a detailed view of the head support 1010 and chest support arm 1030 of body support 1000 according to one or more embodiments. The head support 1010 includes a forehead support cushion 1015 and a lower support cushion 1080. The forehead support cushion 1015 is adjustably attached to the head support 1010, for example by snaps, hook-and-loop fasteners (e.g., Velcro®), an adhesive, straps, clasps, hooks, magnetic fasteners (e.g., magnetic clasps and/or magnetic snaps) or other attachment mechanism. The adjustable attachment allows the forehead support cushion 1015 to be adjusted upwardly and downwardly to accommodate users having different face sizes. In one example, the forehead support cushion 1015 can be adjusted to a high position (i.e., away from chest support arm 1030) to accommodate a user having a larger or longer face. In another example, the forehead support cushion 1015 can be adjusted to a low position (i.e., towards chest support arm 1030) to accommodate a user having a smaller or shorter face. In some embodiments, the forehead support cushion 1015 can be removed and/or replaced by disabling the attachment mechanism. For example, the hook-and-loop fasteners can be pulled apart to remove (and/or adjust) the forehead support cushion 1015. The forehead support cushion 1015 can have a thickness of about 1 inch to about 2 inches, including about 1.25 inches, about 1.45 inches, about 1.5 inches, and about 1.75 inches, or any thickness or thickness range between any two of the foregoing thicknesses. The forehead support cushion 1015 can also have a width of 5.5 inches to about 6.5 inches, including about 5.75 inches, about 6 inches, and about 6.25 inches, or any width or width range between any two of the foregoing widths. The forehead support cushion 1015 can also have a length or height of about 1 inch to about 2 inches, including about 1.25 inches, about 1.5 inches, and about 1.75 inches, including any height or height range between any two of the foregoing heights.

The lower support cushion 1080 includes first and second sections 1082, 1084 that are adjustably attached to head support 1010, for example by snaps, hook-and-loop fasteners (e.g., Velcro®), an adhesive, straps, clasps, hooks, magnetic fasteners (e.g., magnetic clasps and/or magnetic snaps) or other attachment mechanism. The first and second sections 1082, 1084 support the user's cheeks when the user is in a forward-leaning position. A center section 1086 of lower support cushion 1080 supports the user's chin when the user is in a forward-leaning position. In some embodiments, the lower support cushion 1080 can be removed and/or replaced by disabling the attachment mechanism. For example, the hook-and-loop fasteners can be pulled apart to remove (and/or adjust) the lower support cushion 1080. The lower support cushion 1080 can have a thickness of about 0.5 inches to about 1.5 inches, including about 0.7 inches, about 0.75 inches, about 1 inch, and about 1.25 inches, including any thickness or thickness range between any two of the foregoing thicknesses. In addition, the lower support cushion 1080, when the center section is in an unflexed state (as described below), can have a length (i.e., from first section 1082 to second section 1084) of about 4.5 inches to about 5 inches, including about 4.75 inches, and it can have a width of about 5 inches to about 6.5 inches, including about 5.5 inches, about 5.75 inches, about 6 inches, about 6.2 inches, and about 6.25 inches, including any length or length range between any two of the foregoing lengths.

The first and second sections 1082, 1084 can be adjusted inwardly or outwardly to accommodate users having different face sizes. In one example, the first and second sections 1082, 1084 are adjusted inwardly to accommodate a user having a smaller or narrower face. In another example, the first and second sections 1082, 1084 are adjusted outwardly to accommodate a user having a larger or wider face. The first and second sections 1082, 1084 can also be adjusted upwardly (i.e., away from chest support arm 1030) or downwardly (i.e., towards chest support arm 1030) to accommodate users having different face sizes. Moving the first and second sections 1082, 1084 upwardly or downwardly also causes the center section 1086 to move upwardly or downwardly to support the user's chin at different heights.

Thus, the lower support cushion 1080 can be adjusted in two customization degrees of freedom: (a) laterally (inwardly or outwardly) and/or (b) vertically (upwardly or downwardly). All combinations of the foregoing are possible. For example, the lower support cushion 1080 can be adjusted inwardly and upwardly, inwardly and downwardly, outwardly and upwardly, and/or outwardly and downwardly.

FIG. 8G also illustrates the adjustability of the chest support cushion 1035 with respect to the chest support arm 1030. In addition to adjusting the length of the chest support arm 1030 and the attachment point of the chest support arm 1030 on the first end 1051 of the base 1050 using saw tooth mechanism 1038, the chest support cushion 1035 can be adjusted attached upwards or downwards on the chest support arm 1030 so that the chest support cushion 1035 aligns with the user's sternum. The body support 1000 can also include additional adjustment mechanisms to align the chest support 1035 with the user's sternum, for example as described above with respect to FIGS. 8A-8F. The inventors have recognized that the sternum is a desirable location to support the user's body because the sternum is a large, flat bone that is designed to protect the lungs, blood vessels, heart, parts of the spleen, stomach and kidneys from traumatic injury. Thus, the sternum is designed to withstand pressure from the chest support arm 1030 and chest support cushion 1035 to support the user in a forward-leaning position while using the body support 1000. The chest support arm 1030 and chest support cushion 1035 have generally planar surfaces to generally conform to the shape of the sternum. As discussed above, the adjustability mechanisms described herein (e.g., the adjustability of the chest support cushion 1035, the length of the chest support arm 1030, and the attachment point of the chest support arm 1030 on the first end 1051 of the base 1050 using saw tooth mechanism 1038, and the adjustability of the base 1050) allow the user to align the chest support cushion 1035 with the user's sternum.

The chest support arm 1030 has a narrow profile to facilitate portability of the body support 1000. In some embodiments, the chest support arm 1030 is about 2.5 inches to about 3.5 inches wide, including about 3 inches wide;

about 5 inches to about 7 inches long, including about 6 inches long and any width or width range between any two of the foregoing widths. In addition, the chest support arm 1030 can have a thickness of about 0.5 inches to about 1 inch, including about 0.8 inches, and any thickness or thickness range between any two of the foregoing thicknesses. The chest support cushion 1035 is adjustably attached to the chest support arm 1030, for example by snaps, hook-and-loop fasteners (e.g., Velcro®), an adhesive, straps, clasps, hooks, magnetic fasteners (e.g., magnetic clasps and/or magnetic snaps) or other attachment mechanism. The chest support cushion 1035 can be adjusted upwardly or downwardly with respect to the chest support arm 1030 as desired by the user. In some embodiments, the chest support cushion 1035 can be removed and/or replaced by disabling the attachment mechanism. For example, the hook-and-loop fasteners can be pulled apart to remove (and/or adjust) the chest support cushion 1035.

In some embodiments, the chest support cushion 1035, the lower support cushion 1080, and/or the forehead support cushion 1015 can comprise a gel or gel-like substance, such as TechnoGel® (available from Technogel US Inc.), and can have a firmness of about OOO 15 durometer to about OOO 25 durometer, including about OOO 20 durometer and any value or range between any two of the foregoing values. A firmness of OOO 15 durometer to OOO 25 durometer, in addition to the shape and volume of the cushions, can provide a uniform or substantially uniform distribution of contact pressure, for example with the user's cheeks, cheekbones, forehead, and/or chest. Providing a uniform or substantially uniform distribution of contact pressure can enhance the user's comfort in the face region. The uniform or substantially uniform distribution of contact pressure also allows the size and volume of the cushions to decrease, while maintaining user comfort, allowing the body support 1000 to be more compact and portable. Moreover, the adjustability features of the body support 1000 allow the user to customize the height and angle of the chest support arm 1030 (e.g., to align with the user's sternum), to customize the height and angle of the head support 1010, to customize the height and angle of the pivot angle adjustment arm 1070, to customize the position of the base 1050, and to customize the position (laterally and/or vertically) of each cushion (e.g., the forehead support cushion 1015; the lower support cushion 1080, including first, second, and/or middle sections 1082, 1084, 1086 thereof; and the chest support cushion 1035). In some aspects, the combination of (a) the uniform or substantially uniform distribution of contact pressure provided by the gel or gel-like cushions, (b) the adjustability features allow the body support 1000 to be more compact and portable without sacrificing user comfort.

The chest support cushion 1035 can have the same or similar dimensions as the chest support arm 1030. In some embodiments, the chest support cushion 1035 is or includes a padded cushion (e.g., foam) while the lower support cushion 1080 and the forehead support cushion 1015 can comprise a gel or gel-like substance, as discussed above. The padded cushion can have a thickness of about 0.5 inches to about 2 inches, including about 1 inch and about 1.5 inches, including any thickness or thickness range between any two of the foregoing thicknesses.

FIG. 8H illustrates the head support 1010 and chest support arm 1030 in use with a person 1100 having a small head size. The person 1100 is facing away from the page in FIG. 8H to illustrate how the head support 1010 and chest support arm 1030 align with and support the person's 1100 face. However, in use, the person 1100 would face into the page so that the person's 1100 forehead would be supported by forehead support cushion 1015, and the person's 1100 cheeks and chin would be supported by lower support cushion 1080. To accommodate the relatively small head size of person 1100, forehead support cushion 1015 is adjusted downwardly and the lower support cushion 1080 is adjusted inwardly and upwardly.

FIG. 8I illustrates the head support 1010 and chest support arm 1030 in use with a person 1101 having a large head size. The person 1101 is facing away from the page in FIG. 8I, for the same reasons as those discussed above with respect to FIG. 8H. To accommodate the relatively large head size of person 1101, forehead support cushion 1015 is adjusted upwardly and the lower support cushion 1080 is adjusted outwardly and downwardly. FIG. 8I also illustrates that the head support 1010 is configured to support the head (e.g., forehead, chin, and cheeks) of the person 1101 while the person 1101 wears glasses, which do not contact the head support 1010.

As can be seen in FIGS. 8H and 8I, the head support 1010 (including the above-described forehead and lower cushions 1015, 1080) contacts the face of the user (e.g., person 1100, 1101) at four locations: the forehead, the left and right cheeks, and the chin. Additional contact points can also be provided.

Figure 9:
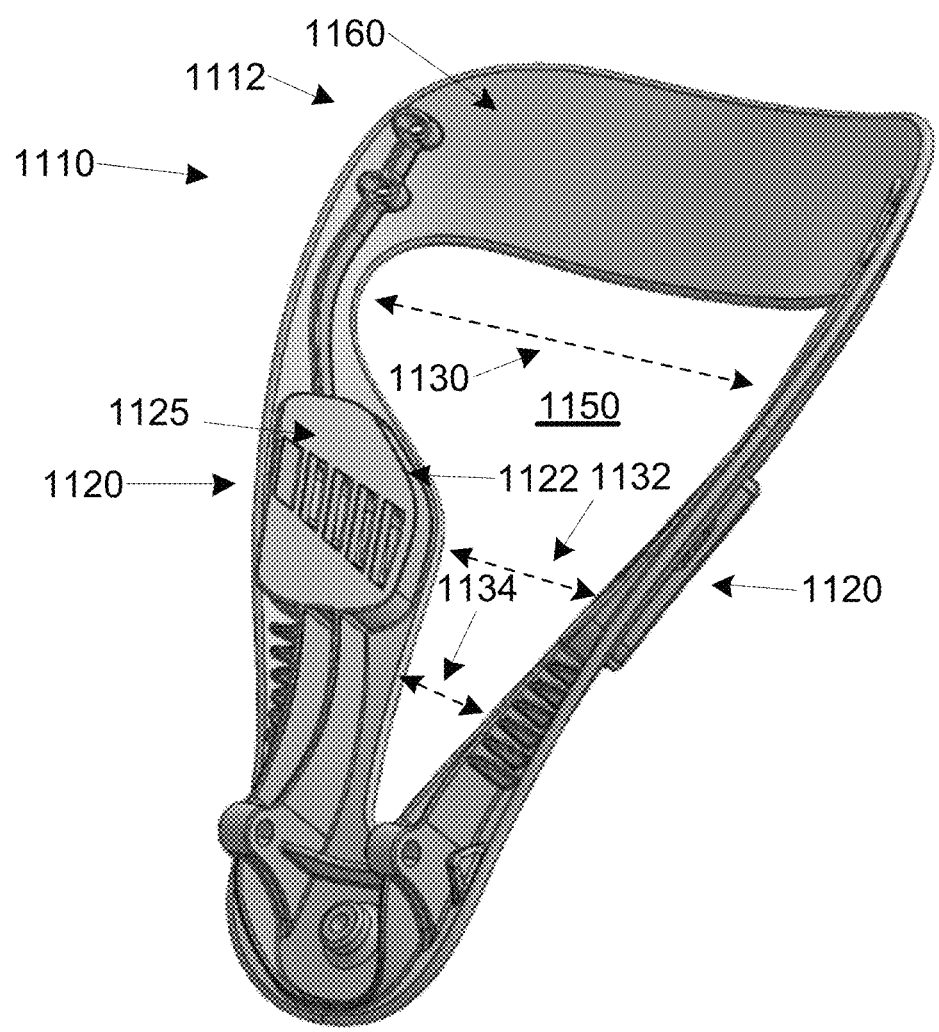
FIG. 9 is a perspective view of a head support according to one or more embodiments.

FIG. 9 is a perspective view of a head support 1110 according to one or more embodiments. The head support 1110 can be the same as, substantially the same as, or different than head support 1010. The head support 1110 includes a generally curved inner surface 1112 that is configured and arranged to support and conform to a user's face. In one example, the curved inner surface 1112 is similar to that found in a mask such that it generally conforms to a user's face.

In addition, FIG. 9 illustrates that head support 1110 includes a pair of cheek support bodies 1120. The cheek support bodies 1120 have a cross-sectional thickness 1122 such that an exposed surface 1125 of each cheek support body 1120 is closer to the user than the inner surface 1112 of head support 1110. The cheek support bodies 1120 provide additional support for the user's cheeks and surrounding bone structure. In some embodiments, each cheek support body 1120 has a width of about 1.25 inches to about 1.75 inches, including about 1.5 inches and any width or width range between any two of the foregoing widths; a length of about 0.25 inches to about 0.5 inches, including about 0.35 inches and any length or length range between any two of the foregoing lengths; and a depth of about 0.125 inches to about 0.5 inches, including about 0.25 inches and any depth or depth range between any two of the foregoing depths. The first and second sections 1082, 1084 of lower support cushion 1080 (not illustrated in FIG. 9) are disposed on the cheek support bodies 1120. In addition, the first and second sections 1082, 1084 of lower support cushion 1080 are removably and adjustably attached to the head support 1110, for example in the region of head support 1110 proximal or adjacent to cheek support bodies 1120. The cheek support bodies 1120 can be symmetrically disposed on the head support 1110.

FIG. 9 also illustrates that a hollow region or aperture 1150 (in general, aperture 1150) defined by the head support 1110 includes an upper section having a first width 1130, a middle section having a second width 1132, and a lower section having a third width 1134. The second width 1132 is narrower than the first width 1130 and the second width 1132 is wider than the third width 1134. Thus, the head support generally tapers inwardly from the first width 1130 to the second width 1132 to the third width 1134. The first width 1130 is wide enough to allow the user's eyes, and preferably glasses, to fit into the aperture 1150 while the user's forehead is supported by a forehead support cushion on forehead support portion 1160 of head support 1110 (e.g., as illustrated in FIGS. 8H and 8I). The second width 1132 is wide enough to allow the user's nose to fit into the aperture 1150 while the user's cheeks are supported by cheek support bodies 1120 (e.g., as illustrated in FIGS. 8H and 8I). The third width 1134 is wide enough to allow the user's mouth to fit into the aperture 1150 while the user's chin is supported by the lower support cushion (e.g., as illustrated in FIGS. 8H and 8I).

Figure 10:
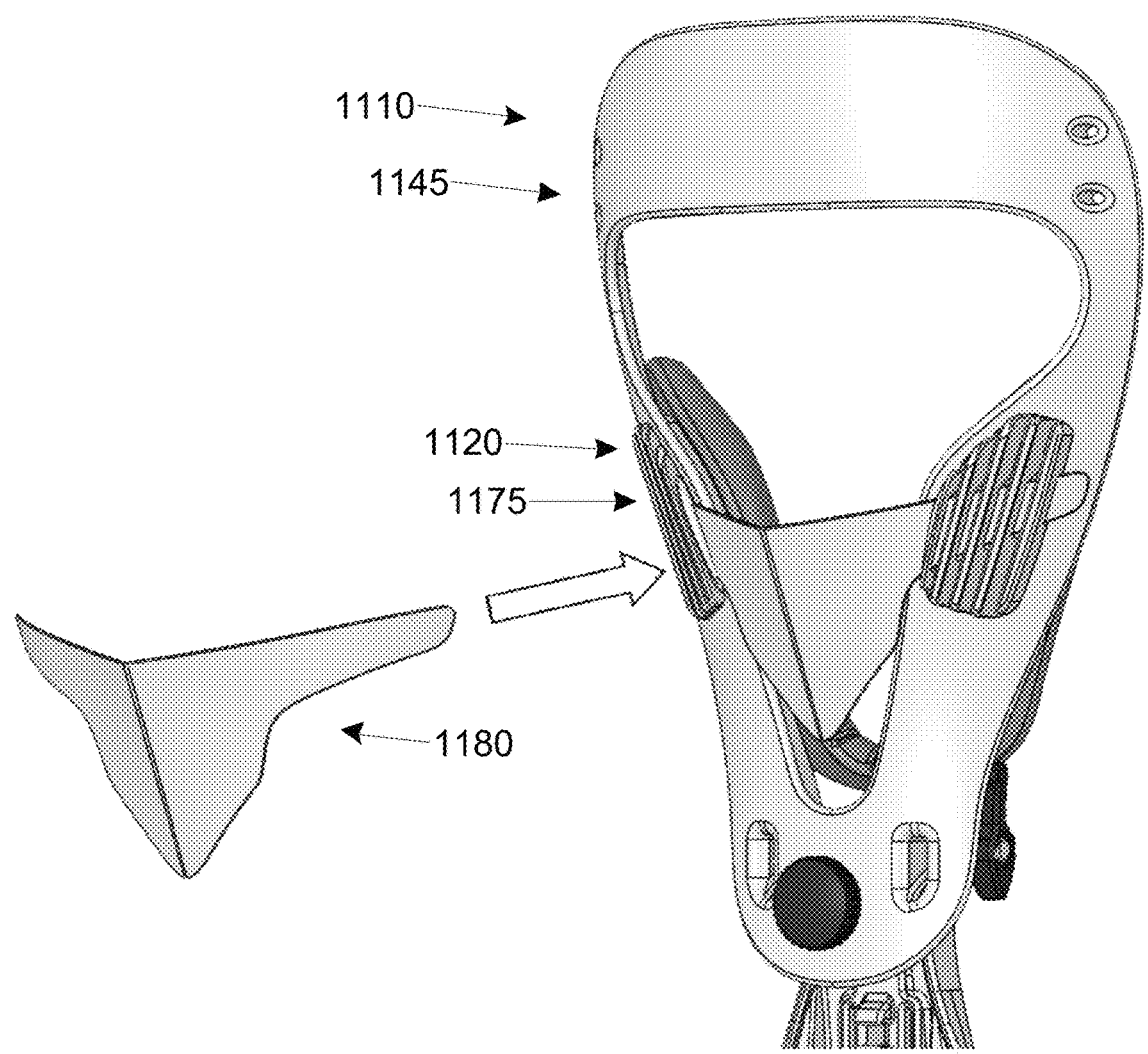
FIG. 10 is a perspective view of the outer surface of head support according to one or more embodiments.

FIG. 10 is a perspective view of the outer surface 1145 of head support 1110 according to one or more embodiments. As illustrated, a pair of aromatherapy receptacles 1175 is disposed on the outer surface 1145 of head support 1110 proximal to cheek support bodies 1120. In some embodiments, the aromatherapy receptacles 1175 and the cheek support bodies 1120 are integrally formed together. In some embodiments, the aromatherapy receptacles 1175 and the cheek support bodies 1120 are aligned on opposing surfaces (e.g., outer and inner surfaces, respectively) of head support 1110. Each aromatherapy receptacle 1175 includes a recess that can accept an aromatherapy strip 1180 such that the aromatherapy strip 1180 is held proximal to the user's nose. The aromatherapy strip 1180 can include one or more scents, fragrances, and/or essential oils.

Figure 11:
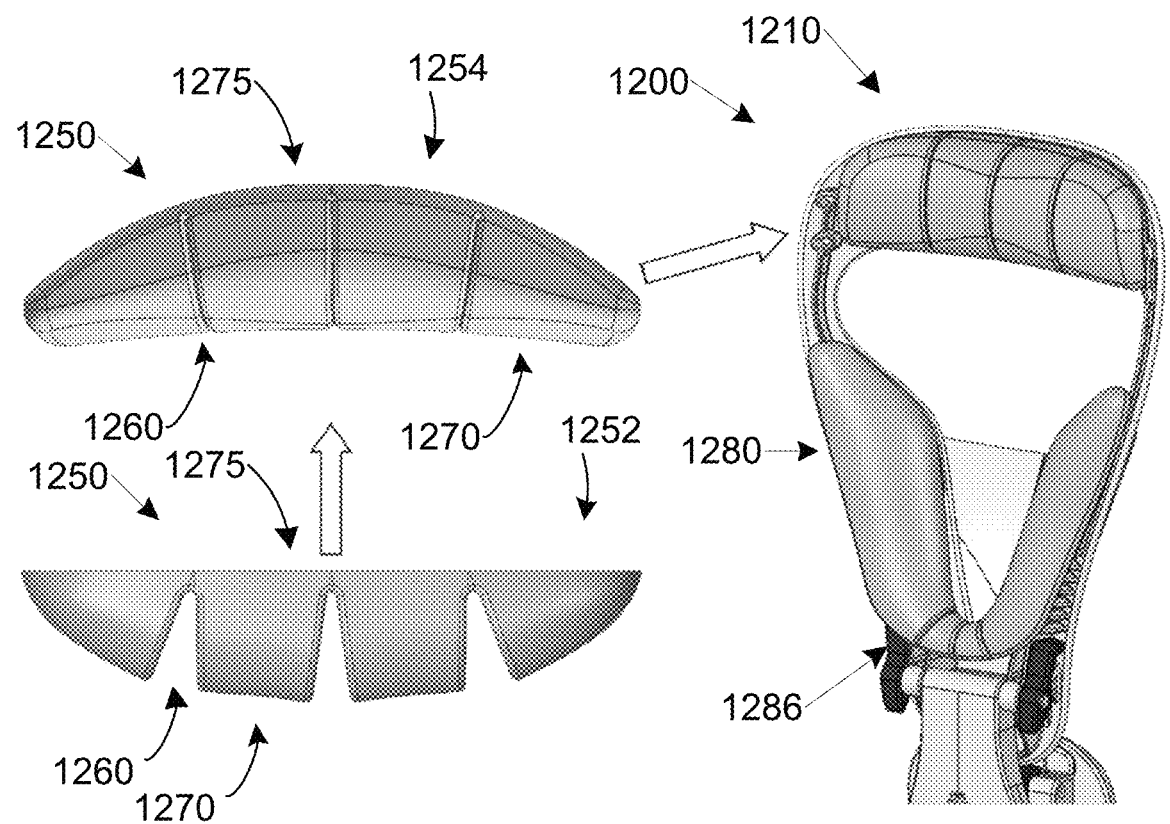
FIG. 11 is a perspective view of a body support to illustrate the structure and function of a representative support cushion in an unflexed state and a flexed state.

FIG. 11 is a perspective view of a portion of body support 1200 to illustrate the structure and function of a representative support cushion 1250 in an unflexed state 1252 and a flexed state 1254 according to one or more embodiments. The support cushion 1250 includes a plurality of notches 1260 defined in a first side 1270 of the support cushion 1250. In the unflexed state 1252, the notches 1260 form gaps between adjacent portions 1270 of the support cushion 1250 and the second surface 1275 of the support cushion is substantially flat or planar. In the flexed state 1254, adjacent portions 1270 of the support cushion 1250 are pressed against one another and to partially or completely fill the gaps and the second surface 1275 forms a curved surface. This allows the support cushion 1250 to be manufactured with a substantially planar or flat second surface 1275 (e.g., in unflexed state 1252), and then it can be flexed into a curved surface (e.g., in flexed state 1254) to mount on head support 1210.

In the example illustrated in FIG. 11, the support cushion 1250 is configured to support a user's forehead at an upper portion of head support 1110. In another example, the center section 1286 of lower support cushion 1280 comprises a similar group of notches. As such, the lower support cushion 1280 can be manufactured in an unflexed state (e.g., at least one surface being substantially flat or planar) but it can be mounted on head support 1210 in a flexed state (e.g., as illustrated in FIG. 11). The support cushion 1250 and/or lower support cushion 1280 can comprise a gel or gel-like substance, such as TechnoGel® (available from Technogel US Inc.) and can have a firmness of OOO 15 durometer to OOO 25 durometer, including about OOO 20 durometer and any value or range between any two of the foregoing values.

Figure 12:
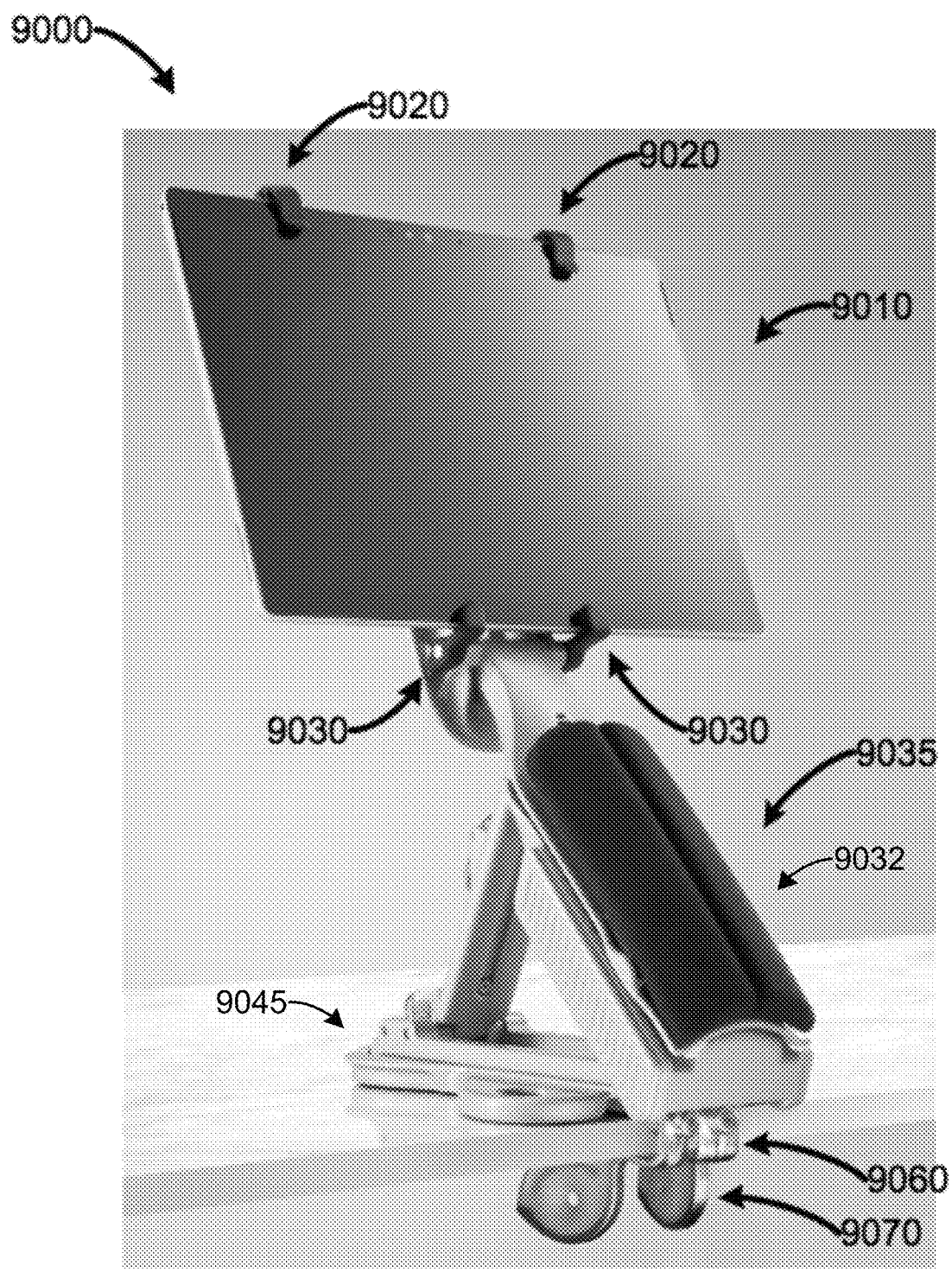
FIG. 12 illustrates a body support that can also function as a mobile device stand, according to one or more embodiments.

FIG. 12 illustrates a body support 9000 that can also function as a mobile device stand 9010, according to one or more embodiments. The mobile device stand 9010 includes an upper mobile device support 9020 and a lower mobile device support 9030. The mobile device supports 9020, 9030 can be or can include hooks, clamps, brackets, or other mechanism(s) that can support and retain the mobile device.

The supports 9020, 9030 can include a spring mechanism or they can be semi-rigid such that the supports 9020, 9030 engage and retain the mobile device on the stand 9010. The position of the supports 9020, 9030 can be adjustable so that the mobile device stand 9010 can accommodate mobile devices of different sizes. For example, the supports 9020, 9030 can be moved inwardly to engage a smartphone and they can be moved outwardly to engage a tablet, such as an iPad®.

The body support 9000 includes a head support 9050, a body 9032, a chest support 9035, a base 9045. The head support 9050 is viewable in FIG. 13 but it is not viewable in FIG. 12 since it is behind the mobile device. Thus, the head support 9050 can alternately function as a mobile device stand 9010. The body support 9000 can include any or all of the features in the body supports described herein (e.g., in FIGS. 8A-8I and/or FIGS. 9-11). As such, the head support 9050 and other components of the body support 9000 can be adjusted to position the mobile device at the desired height, position, and/or angle.

The device 9000 can include rubberized feet 9070 that can be attached to brackets 9060 to secure the device 9000 to the table.

Figure 13:
FIG. 13 illustrates the body support of FIG. 12 without a mobile device and with the mobile device supports in a stowed configuration, according to one or more embodiments.

FIG. 13 illustrates the body support 9000 without a mobile device and with the mobile device supports 9020, 9030 in a stowed configuration, according to one or more embodiments. Upper supports 9020 attach to the sides of the head support 9050 frame. FIG. 13 also illustrates that the upper supports 9020 can be attached to an adjustable bungee cord 9025, which itself is secured to the head support 9050 frame. To deploy the upper supports 9020, the user lifts the upper supports 9020 off of the head support 9050 frame and loosens the bungee cord 9025. The user then places the upper supports 9020 on the upper edge of his mobile device and tightens the bungee cord 9025 to secure the mobile device stand. The bungee cord 9025 provides tension to the mobile device so that it is secured against the lower supports 9030. The bungee cord 9025 also reduces or eliminates movement of the mobile device when the user presses on the mobile device's touch screen or one of its buttons.

The lower supports 9030 fold up towards the head support when they are in the stowed position, as illustrated in FIG. 13. The lower supports 9030 can include a telescoping mechanism so that they can be moved outwards to support a wider mobile device.

The present disclosure should not be considered limited to the particular embodiments described above. For example, one or more of the bodyrests described herein can be adapted for a wheel chair, an arm chair, or other configuration. As a specific example, the bodyrest can include elongated lower supports and/or legs that are configured to support the bodyrest on the arms of a wheel chair and/or between the user's legs while positioning the bodyrest at a height appropriate for the seated user. Similarly, the bodyrest can be configured to rest on or attach to a table that lays across the arms of a wheel chair and/or on the user's lap. Additional modifications, equivalent processes, as well as numerous structures to which the present disclosure may be applicable, will be readily apparent to those skilled in the art to which the present disclosure is directed upon review of the present disclosure.

What is claimed is:
1. A personal support apparatus comprising:
a head support frame having an inner surface for supporting a forehead of a user while seated in a forward-leaning position, the head support frame having a hollow central region to receive the user's face when the user is seated in the forward-leaning position;
a stand comprising a chest support arm and a pivot angle adjustment arm; and
a base,
wherein:
   a length of the chest support arm is adjustable, the length of the chest support arm extending from a first end to a second end of the chest support arm,
   the first end of the chest support arm is pivotably attached to the head support frame,
   a length of the pivot angle adjustment arm is adjustable, the length of the pivot angle adjustment arm extending from a first end to a second end of the pivot angle adjustment arm,
   the first end of the pivot angle adjustment arm is releasably attached to the chest support arm,
   the second end of the pivot angle adjustment arm is pivotably attached to the base,
   the chest support arm is adjustably attached to the base,
   the base includes a clamp that receives an edge of a working surface, and
   the base includes a base plate that is adjustable relative to the clamp along an axis of the base such that the base plate can adjustably move towards or away from the user while the clamp is disposed on the edge of the working surface.

2. The apparatus of claim 1, wherein a first end of the base is releasably attached to the chest support arm at an attachment point, the attachment point being adjustable along at least a portion of the length of the chest support arm.

3. The apparatus of claim 2, wherein the attachment point corresponds to a height of the head support frame with respect to the base.

4. The apparatus of claim 3, wherein the height of the head support frame is further adjustable by adjusting the length of the chest support arm.

5. The apparatus of claim 1, wherein the length of the pivot angle adjustment arm corresponds to a pivot angle of the chest support arm.

6. The apparatus of claim 5, wherein the pivot angle corresponds to an angular orientation of the head support frame.

7. The apparatus of claim 1, wherein the chest support arm includes first and second plates that slideably engage each other to adjust the length of the chest support arm.

8. The apparatus of claim 1, wherein the apparatus has a stowed configuration where the pivot angle adjustment arm is detached from the chest support arm, the pivot angle adjustment arm is pivoted against the base, the chest support arm is pivoted against the pivot angle adjustment arm, and the head support frame is pivoted inwardly against the chest support arm.

9. The apparatus of claim 8, wherein in the stowed configuration:
   the head support frame, the chest support arm, the pivot angle adjustment arm, and the base are disposed substantially parallel to one another, and
   a height of the apparatus in the stowed configuration is smaller than the height of the apparatus in a deployed configuration.

10. The apparatus of claim 1, further comprising a chest support cushion releasably attached to the chest support arm.

11. A personal support apparatus having stowed and deployed configurations, the apparatus comprising:
   a head support frame having an inner surface for supporting a forehead of a user while seated in a forward-leaning position, the head support frame having a hollow central region to receive the user's face when the user is seated in the forward-leaning position;
   a base;
   a chest support arm having first and second ends, the first end of the chest support arm pivotably attached to the head support frame; and
   a pivot angle adjustment arm having first and second ends, the second end of the pivot angle adjustment arm pivotably attached to the base,
   wherein:
      in the deployed configuration:
         the first end of the pivot angle adjustment arm is releasably attached to the chest support arm, and
         the chest support arm is adjustably attached to the base, and
      in the stowed configuration:
         the first end of the pivot angle adjustment arm is detached from the chest support arm,
         the pivot angle adjustment arm is pivoted against the base,
         the chest support arm is pivoted against the pivot angle adjustment arm,
         the head support frame is pivoted inwardly against the chest support arm, and
         the base includes a base plate that slidingly engages a clamp plate along an axis, the clamp plate including a clamp that receives an edge of a working surface, such that in the deployed configuration the base plate can adjustably move towards or away from the user while the clamp is disposed on the edge of the table.

12. The apparatus of claim 11, wherein in the stowed configuration:
   the head support frame, the chest support arm, the pivot angle adjustment arm, and the base are disposed substantially parallel to one another, and
   a height of the apparatus in the stowed configuration is smaller than the height of the apparatus in a deployed configuration.

13. The apparatus of claim 11, wherein:
   a length of the chest support arm is adjustable, the length of the chest support arm extending from the first end to the second end of the chest support arm, and
   in the deployed configuration, a height of the head support frame with respect to the base is adjustable by adjusting the length of the chest support arm.

14. The apparatus of claim 13, wherein in the deployed configuration, a first end of the base is releasably attached to the chest support arm at an attachment point, the attachment point being adjustable along at least a portion of the length of the chest support arm.

15. The apparatus of claim 14, wherein the height of the head support frame is further adjustable by adjusting the attachment point along at least a portion of the length of the chest support arm.

16. The apparatus of claim 11, wherein in the deployed configuration, the length of the pivot angle adjustment arm corresponds to a pivot angle of the chest support arm.

17. The apparatus of claim 16, wherein the pivot angle corresponds to an angular orientation of the head support frame.

18. The apparatus of claim 11, further comprising a chest support cushion adjustably attached to the chest support arm.

19. The apparatus of claim 11, wherein in the deployed configuration:

a first end of the base is releasably attached to the chest support arm at an attachment point, the attachment point being adjustable along at least a portion of the length of the chest support arm, and the chest support arm can extend below a plane of the working surface when the base plate is moved towards the user to extend a height range of the head support frame with respect to the base.

20. A personal support apparatus comprising:

a head support frame having an inner surface for supporting a forehead of a user while seated in a forward-leaning position, the head support frame having a hollow central region to receive the user's face when the user is seated in the forward-leaning position;

a stand comprising a chest support arm and a pivot angle adjustment arm; and a base, wherein:
 a length of the chest support arm is adjustable, the length of the chest support arm extending from a first end to a second end of the chest support arm,
 the first end of the chest support arm is pivotably attached to the head support frame,
 a length of the pivot angle adjustment arm is adjustable, the length of the pivot angle adjustment arm extending from a first end to a second end of the pivot angle adjustment arm,
 the first end of the pivot angle adjustment arm is releasably attached to the chest support arm,
 the second end of the pivot angle adjustment arm is pivotably attached to the base,
 the chest support arm is adjustably attached to the base, and
 the chest support arm includes first and second plates that slideably engage each other to adjust the length of the chest support arm.

21. The apparatus of claim 20, wherein a first end of the base is releasably attached to the chest support arm at an attachment point, the attachment point being adjustable along at least a portion of the length of the chest support arm.

22. A personal support apparatus having stowed and deployed configurations, the apparatus comprising:

a head support frame having an inner surface for supporting a forehead of a user while seated in a forward-leaning position, the head support frame having a hollow central region to receive the user's face when the user is seated in the forward-leaning position;

a base;

a chest support arm having first and second ends, the first end of the chest support arm pivotably attached to the head support frame; and a pivot angle adjustment arm having first and second ends, the second end of the pivot angle adjustment arm pivotably attached to the base, wherein:
 in the deployed configuration:
  the first end of the pivot angle adjustment arm is releasably attached to the chest support arm,
  the chest support arm is adjustably attached to the base,
  a height of the head support frame with respect to the base is adjustable by adjusting the length of the chest support arm,
  a first end of the base is releasably attached to the chest support arm at an attachment point, the attachment point being adjustable along at least a portion of the length of the chest support arm, and
  a length of the chest support arm is adjustable, the length of the chest support arm extending from the first end to the second end of the chest support arm, and
 in the stowed configuration:
  the first end of the pivot angle adjustment arm is detached from the chest support arm,
  the pivot angle adjustment arm is pivoted against the base,
  the chest support arm is pivoted against the pivot angle adjustment arm, and
  the head support frame is pivoted inwardly against the chest support arm.

23. The apparatus of claim 7, wherein the first end of the pivot angle adjustment arm is releasably attached to the first plate of the chest support arm.

24. The apparatus of claim 11, wherein:

the chest support arm includes first and second plates that slideably engage each other to adjust a length of the chest support arm, and in the deployed configured the first end of the pivot angle adjustment arm is releasably attached to the first plate of the chest support arm.

* * * * *